United States Patent
Tsubaki et al.

(10) Patent No.: US 10,994,776 B1
(45) Date of Patent: May 4, 2021

(54) VEHICLE STEERING APPARATUS

(71) Applicant: NSK LTD., Tokyo (JP)

(72) Inventors: Takahiro Tsubaki, Maebashi (JP); Hiroyasu Kumagai, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/638,607

(22) PCT Filed: Feb. 19, 2019

(86) PCT No.: PCT/JP2019/006041
§ 371 (c)(1),
(2) Date: Feb. 12, 2020

(87) PCT Pub. No.: WO2020/012689
PCT Pub. Date: Jan. 16, 2020

(30) Foreign Application Priority Data

Jul. 13, 2018  (JP) .............................. JP2018-133056

(51) Int. Cl.
*B62D 6/00* (2006.01)
*B62D 5/04* (2006.01)
*B62D 15/02* (2006.01)

(52) U.S. Cl.
CPC ........... *B62D 6/008* (2013.01); *B62D 5/0409* (2013.01); *B62D 5/0481* (2013.01); *B62D 15/022* (2013.01)

(58) Field of Classification Search
CPC .... B62D 6/008; B62D 5/0409; B62D 15/022; B62D 5/0481; B62D 6/00
(Continued)

(56) References Cited

U.S. PATENT DOCUMENTS 9,902,424 B2 * 2/2018 Oshima ................ B62D 5/0457
2017/0232997 A1 * 8/2017 Tsubaki ............. B62D 15/0215
180/443

(Continued)

FOREIGN PATENT DOCUMENTS

CN   107531275 A   1/2018
JP   2002-104210 A   4/2002
(Continued)

OTHER PUBLICATIONS

International Search Report for PCT/JP2019/006041, dated Mar. 19, 2019.
(Continued)

*Primary Examiner* — Shardul D Patel
(74) *Attorney, Agent, or Firm* — Sughrue Mion, PLLC

(57) ABSTRACT

A vehicle steering apparatus that obtains the appropriate steering torque to the steering angle without being affected by road surface state and changes of mechanical characteristics of the steering system due to aging. The steering apparatus includes a target steering torque generating section to generate a target steering torque, a converting section to convert the target steering torque into a target torsional angle, and a torsional angle control section to calculate a motor current command value so as to follow-up a torsional angle to the target torsional angle. The target steering torque generating section includes an offset correcting section to obtain the first torque signal from a characteristic depending on the set steering angle based on an offset value of the steering torque and outputs the first torque signal as a target steering torque. The steering apparatus drives and controls the motor based on the motor current command value.

8 Claims, 19 Drawing Sheets

(58) Field of Classification Search
USPC .......................................................... 701/41
See application file for complete search history.

(56) References Cited

U.S. PATENT DOCUMENTS

| | | | |
|---|---|---|---|
| 2017/0247051 A1* | 8/2017 | Matsuo | .................... B62D 6/08 |
| 2019/0023319 A1* | 1/2019 | Tyrrell | ................. B62D 15/025 |
| 2020/0108857 A1* | 4/2020 | Tsubaki | ................... B62D 6/00 |

FOREIGN PATENT DOCUMENTS

| | | |
|---|---|---|
| JP | 2003-320951 A | 11/2003 |
| JP | 5208894 B2 | 6/2013 |
| JP | 2015-033941 A | 2/2015 |
| JP | 2017-149373 A | 8/2017 |
| WO | 2016/072143 A1 | 5/2016 |

OTHER PUBLICATIONS

International Preliminary Report on Patentability for PCT/JP2019/006041, dated Jul. 1, 2019.

* cited by examiner

PRIOR ART

VEHICLE STEERING APPARATUS

CROSS REFERENCE TO RELATED APPLICATIONS

This application is a National Stage of International Application No. PCT/JP2019/006041 filed Feb. 19, 2019, claiming priority based on Japanese Patent Application No. 2018-133056 filed Jul. 13, 2018.

TECHNICAL FIELD

The present invention relates to a high-performance vehicle steering apparatus that obtains a desired steering torque based on a torsional angle of a torsion bar and so on, and maintains the desired steering torque without being affected by a road surface state and changes of mechanical system characteristics due to aging.

BACKGROUND ART

An electric power steering apparatus (EPS) which is one of vehicle steering apparatuses provides a steering system of a vehicle with an assist torque (a steering assist torque) by means of a rotational torque of a motor, and applies a driving force of the motor which is controlled by using an electric power supplied from an inverter as the assist torque to a steering shaft or a rack shaft by means of a transmission mechanism including a reduction mechanism. In order to accurately generate the assist torque, such a conventional electric power steering apparatus performs a feed-back control of a motor current. The feed-back control adjusts a voltage supplied to the motor so that a difference between a steering assist command value (a current command value) and a detected motor current value becomes small, and the adjustment of the voltage supplied to the motor is generally performed by an adjustment of a duty ratio of a pulse width modulation (PWM) control.

A general configuration of the conventional electric power steering apparatus will be described with reference to FIG. 1. As shown in FIG. 1, a column shaft (a steering shaft or a handle shaft) 2 connected to a handle (a steering wheel) 1 is connected to steered wheels 8L and 8R through a reduction mechanism 3, universal joints 4a and 4b, a rack-and-pinion mechanism 5, and tie rods 6a and 6b, further via hub units 7a and 7b. In addition, a torque sensor 10 for detecting a steering torque Ts of the handle 1 and a steering angle sensor 14 for detecting a steering angle θh are provided in the column shaft 2 having a torsion bar, and a motor 20 for assisting a steering force of the handle 1 is connected to the column shaft 2 through the reduction mechanism 3. The electric power is supplied to a control unit (ECU) 30 for controlling the electric power steering apparatus from a battery 13, and an ignition key signal is inputted into the control unit 30 through an ignition key 11. The control unit 30 calculates a current command value of an assist command (a steering assist command) based on the steering torque Ts detected by the torque sensor 10 and a vehicle speed Vs detected by a vehicle speed sensor 12, and controls a current supplied to the motor 20 for the electric power steering apparatus (EPS) by means of a voltage control command value Vref obtained by performing compensation or the like to the current command value.

A controller area network (CAN) 40 exchanging various information of a vehicle is connected to the control unit 30, and it is possible to receive the vehicle speed Vs from the CAN 40. Further, it is also possible to connect a non-CAN 41 exchanging a communication, analog/digital signals, a radio wave or the like except for the CAN 40 to the control unit 30.

The control unit 30 mainly comprises a central processing unit (CPU) (including a micro controller unit (MCU), a micro processor unit (MPU) and so on), and general functions performed by programs within the CPU are shown in FIG. 2.

Functions and operations of the control unit 30 will be described with reference to FIG. 2. As shown in FIG. 2, the steering torque Ts detected by the torque sensor 10 and the vehicle speed Vs detected by the vehicle speed sensor 12 (or from the CAN 40) are inputted into a current command value calculating section 31. The current command value calculating section 31 calculates the current command value Iref1 that is a control target value of a current supplied to the motor 20 based on the inputted steering torque Ts and vehicle speed Vs and by using an assist map or the like. The current command value Iref1 is inputted into a current limiting section 33 through an adding section 32A. A current command value Irefm whose maximum current is limited is inputted into a subtracting section 32B, and a deviation I (=Irefm−Im) between the current command value Irefm and a motor current Im being fed-back is calculated. The deviation I is inputted into a proportional integral (PI)-control section 35 for improving a characteristic of the steering operation. The voltage control command value Vref whose characteristic is improved by the PI-control section 35 is inputted into a PWM-control section 36. Furthermore, the motor 20 is PWM-driven through an inverter 37. The motor current Im of the motor 20 is detected by a motor current detector 38 and is fed-back to the subtracting section 32B.

A compensation signal CM from a compensation signal generating section 34 is added to the adding section 32A, and a characteristic compensation of the steering system is performed by the addition of the compensation signal CM so as to improve a convergence, an inertia characteristic and so on. The compensation signal generating section 34 adds a self-aligning torque (SAT) 343 and an inertia 342 at an adding section 344, further adds the added result at the adding section 344 with a convergence 341 at an adding section 345, and then outputs the added result at the adding section 345 as the compensation signal CM.

In such a conventional assist control of the electric power steering apparatus, the steering torque applied by the manual input of the driver is detected as the torsional torque of the torsion bar by the torque sensor, and the motor current is controlled as the assist current depending on mainly the detected steering torque. However, in this method, different steering torques are generated depending on the steering angle due to the difference of the road surface state (for example, a tilt of the road surface). Moreover, even variations of the motor output characteristic due to the long-term use of the motor are affected to the steering torque.

In order to resolve the above problems, the electric power steering apparatus disclosed in, for example, Japanese Patent No. 5208894 (Patent Document 1) is proposed. The electric power steering apparatus of Patent Document 1 sets the target value of the steering torque based on a relationship (a steering reaction force characteristic map) between the steering angle and the steering torque which is determined based on a relationship between the steering angle or the steering torque and a tactile amount in order to apply the appropriate steering torque based on the tactile characteristic of the driver.

The List of Prior Art Documents

Patent Documents

Patent Document 1: Japanese Patent No. 5208894 B2

SUMMARY OF THE INVENTION

Problems to be Solved by the Invention

However, in the electric power steering apparatus of Patent Document 1, it is required that the steering reaction force characteristic map is preliminarily obtained. Since the control is performed based on the deviation between the target value of the steering torque and the detected steering torque, the affection to the steering torque will still be remained.

The present invention has been developed in view of the above-described circumstances, and an object of the present invention is to provide a vehicle steering apparatus that easily obtains equivalent steering torques to the steering angle and so on without being affected by a road surface state and changes of mechanical characteristics of a steering system due to aging.

Means for Solving the Problems

The present invention relates to a vehicle steering apparatus that comprises a torsion bar having any spring constant and a sensor to detect a torsional angle of the torsion bar, and assist-controls a steering system by driving and controlling a motor, the above-described object of the present invention is achieved by that: comprising a target steering torque generating section to generate a target steering torque, a converting section to convert the target steering torque into a target torsional angle, and a torsional angle control section to calculate a motor current command value so as to follow-up the torsional angle to the target torsional angle, wherein the target steering torque generating section comprises an offset correcting section to obtain a first torque signal from a characteristic depending on a steering angle which is set based on an offset value of a steering torque and outputs the first torque signal as the target steering torque, and wherein the vehicle steering apparatus drives and controls the motor based on the motor current command value.

The above-described object of the present invention is efficiently achieved by that: wherein the offset correcting section comprises an offset correction calculating section to calculate a basic torque signal depending on a steering state and the steering angle and outputs the basic torque signal which has a hysteresis characteristic whose value is saturated to a setting value in a right-turning steering and a setting value in a left-turning steering, as the first torque signal; or wherein the offset correction calculating section has a hysteresis characteristic whose width is larger than the offset value; or wherein the offset correcting section further comprises a vehicle speed sensitive gain section to calculate the first torque signal by multiplying the basic torque signal by a vehicle speed sensitive gain; or wherein the vehicle speed sensitive gain has a characteristic that a value of the vehicle speed sensitive gain becomes smaller when a vehicle speed is higher; or wherein the target steering torque generating section further comprises a basic map section to obtain a second torque signal from the steering angle and the vehicle speed using a basic map, and a damper calculating section to calculate a third torque signal based on angular velocity information using a damper gain map which is sensitive to the vehicle speed, and calculates the target steering torque from the first torque signal and at least one of the second torque signal and the third torque signal; or wherein the basic map is sensitive to the vehicle speed and has a characteristic that the second torque signal is zero when the vehicle speed is zero; or wherein the target steering torque generating section further comprises a phase compensating section which is disposed at a previous stage or a subsequent stage of the basic map section and performs a phase compensation, and obtains the second torque signal from the steering angle and the vehicle speed via the basic map section and the phase compensating section.

Effects of the Invention

According to the vehicle steering apparatus of the present invention, by performing a control to the target torsional angle obtained based on the target steering torque which is generated at the target steering generating section, the torsional angle can be operated so as to follow-up the target torsional angle and the desired steering torque based on the steering feeling of the driver can be obtained.

Further, by the operation of the offset correcting section, the occurrence of the unintended assist of the driver due to the offset value of the steering torque can be suppressed and the steering operation can be stabilized when the characteristic of the basic map section is not changed depending on the steering angle, for example in a static steering (the vehicle speed is 0 [km/h]) state as shown in FIG. 6.

MODE FOR CARRYING OUT THE INVENTION

The present invention is a vehicle steering apparatus to obtain an appropriate steering torque to a steering angle and so on without being affected by a road surface state, and obtains a desired steering torque by performing a control so as to follow-up a torsional angle of a torsion bar or the like to a value depending on the steering angle and so on.

Embodiments of the present invention will be described with reference to the accompanying drawings.

Figure 3:
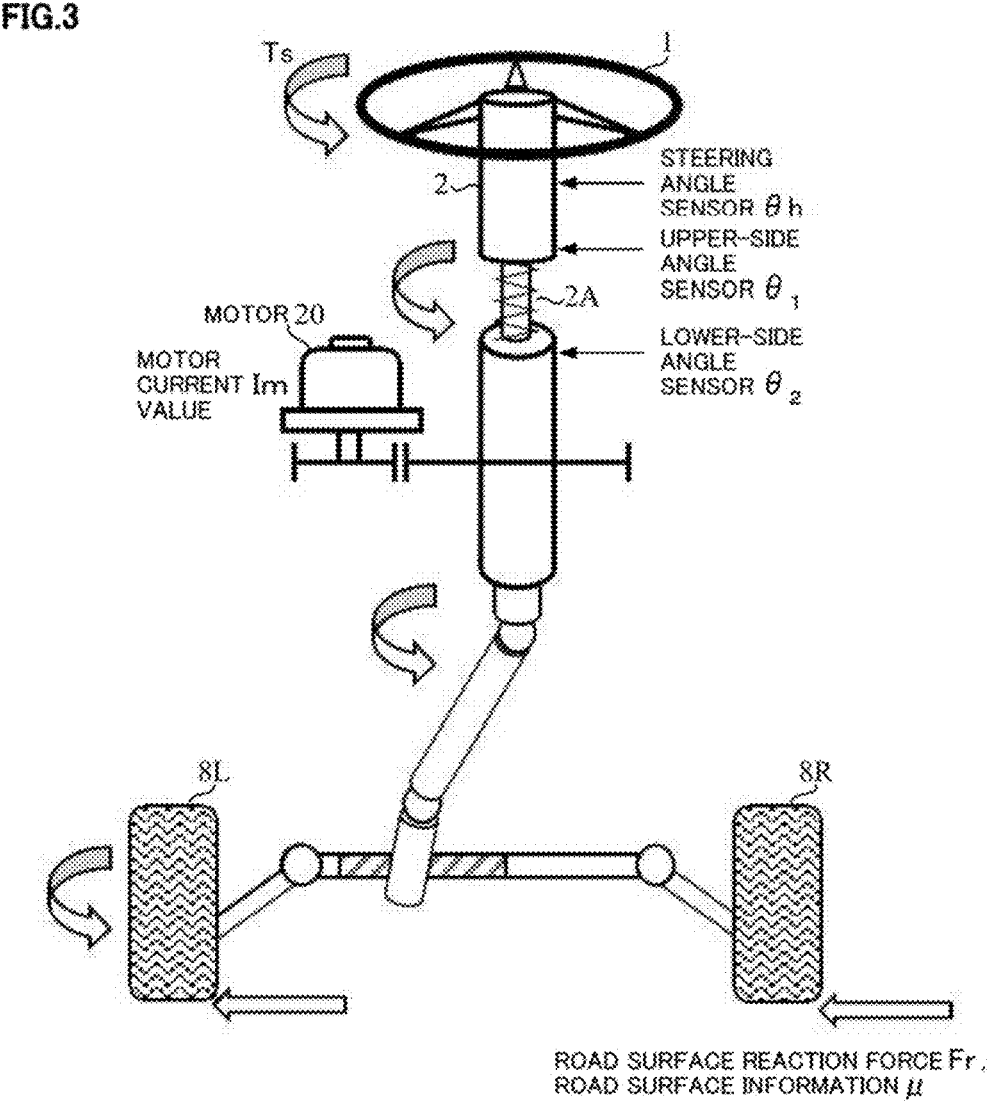
FIG. 3 is a structural diagram showing an installation example of an EPS steering system and various sensors.

First, an installation example of various sensors which detect information related to an electric power steering apparatus (EPS) which is one of the vehicle steering apparatuses according to the present invention will be described. FIG. 3 is a diagram showing an EPS steering system and an installation example of the various sensors, and the torsion bar 2A is provided in the column shaft 2. A road surface reaction force Fr and a road surface information p are operated to the steered wheels 8L and 8R. An upper-side angle sensor is disposed at a handle side of the column shaft 2 above the torsion bar 2A, and a lower-side angle sensor is disposed at a steered wheel side of the column shaft 2 below the torsion bar 2A. The upper-side angle sensor detects a handle ANGLE $\theta_1$ and the lower-side angle sensor detects a column angle $\theta_2$. The steering angle $\theta h$ is detected by a steering angle sensor disposed at an upper portion of the column shaft 2. The torsion bar torsional angle $\Delta\theta$ and the torsion bar torque Tt can be calculated by following Expressions 1 and 2 from a deviation between the handle angle $\theta_1$ and the column angle $\theta_2$. In the Expression 2, "Kt" is a spring constant of the torsion bar 2A.

$$\theta_2 - \theta_1 = \Delta\theta \qquad \text{[Expression 1]}$$

$$-Kt \cdot \Delta\theta = Tt \qquad \text{[Expression 2]}$$

The torsion bar torque Tt can be detected by using the torque sensor disclosed in, for example, Japanese Unexamined Patent Publication No. 2008-216172 A. In the present embodiment, the torsion bar torque Tt is also treated as the steering torque Ts.

Next, the configuration example of the present invention will be described.

Figure 4:
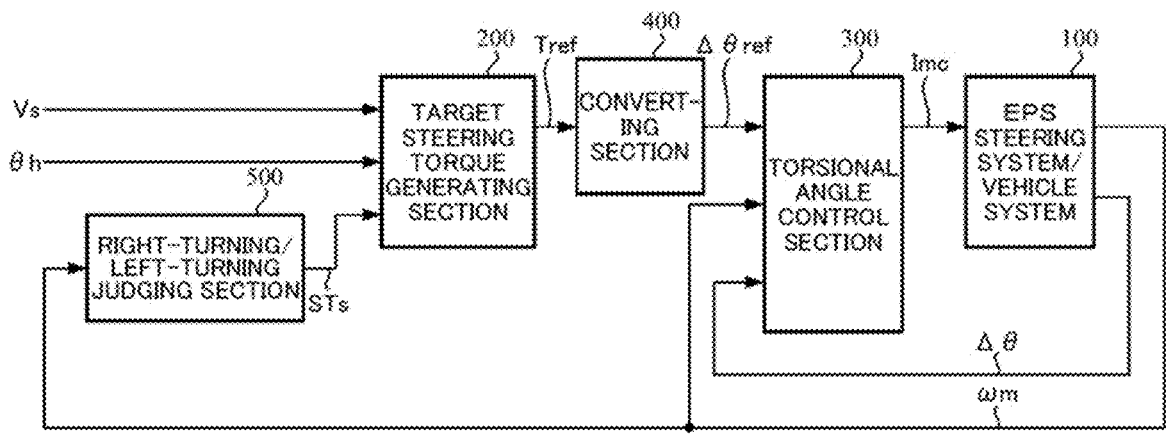
FIG. 4 is a block diagram showing a configuration example of the present invention (the first embodiment)

FIG. 4 is a block diagram showing a configuration example of the present invention (the first embodiment), and the handle steering of the driver is assist-controlled by the motor in an EPS steering system/vehicle system 100. The steering angle $\theta h$, the vehicle speed Vs and a steering state STs which indicates a right-turning or a left-turning and is outputted from a right-turning/left-turning judging section 500 are inputted into a target steering torque generating section 200 which outputs a target steering torque Tref. The target steering torque Tref is converted into a target torsional angle $\Delta\theta$ref at a converting section 400. The target torsional angle $\Delta\theta$ref, the torsional angle $\Delta\theta$ of the torsion bar 2A and the motor angular velocity $\omega m$ are inputted into a torsional angle control section 300. The torsional angle control section 300 calculates a motor current command value Imc so as to follow-up the torsional angle $\Delta\theta$ to the target torsional angle $\Delta\theta$ref and the motor of the EPS is driven by the motor current command value Imc.

The right-turning/left-turning judging section 500 judges whether the steering is the right-turning or the left-turning based on the motor angular velocity $\omega m$, and outputs the judged result as the steering state STs. That is, in a case that the motor angular velocity $\omega m$ is a positive value, the right-turning/left-turning judging section 500 judges "right-turning", and in a case that the motor angular velocity $\omega m$ is a negative value, the right-turning/left-turning judging section 500 judges "left-turning". Instead of the motor angular velocity $\omega m$, the velocity calculation to the steering angle $\theta h$, the handle angle $\theta_1$ or the column angle $\theta 2$ is performed, and the calculated angular velocity may be used.

Figure 5:
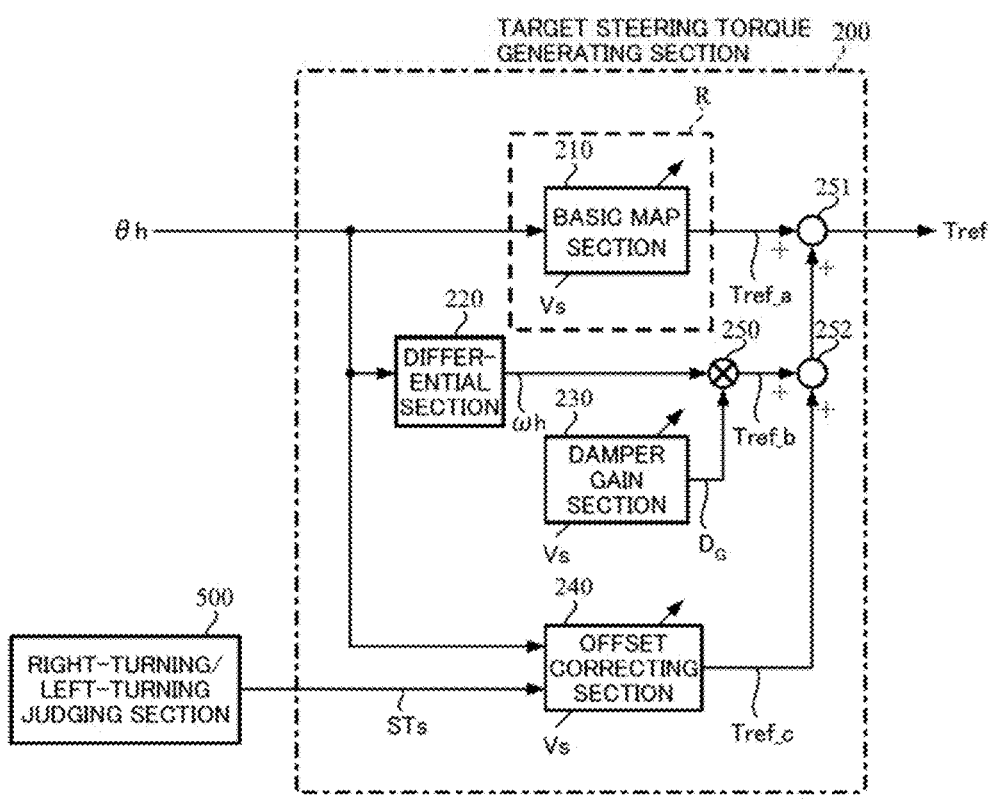
FIG. 5 is a block diagram showing a configuration example of a target steering torque generating section (the first embodiment)

FIG. 5 shows a configuration example of the target steering torque generating section 200 and the target steering torque generating section 200 comprises a basic map section 210, a differential section 220, a damper gain section 230, an offset correcting section 240, a multiplying section 250 and adding sections 251 and 252. The steering angle $\theta h$ is inputted into the basic map section 210, the differential section 220 and the offset correcting section 240. The vehicle speed Vs is inputted into the basic map section 210, the damper gain section 230 and the offset correcting section 240. The steering state STs outputted from the right-turning/left-turning judging section 500 is inputted into the offset correcting section 240.

Figure 6A:
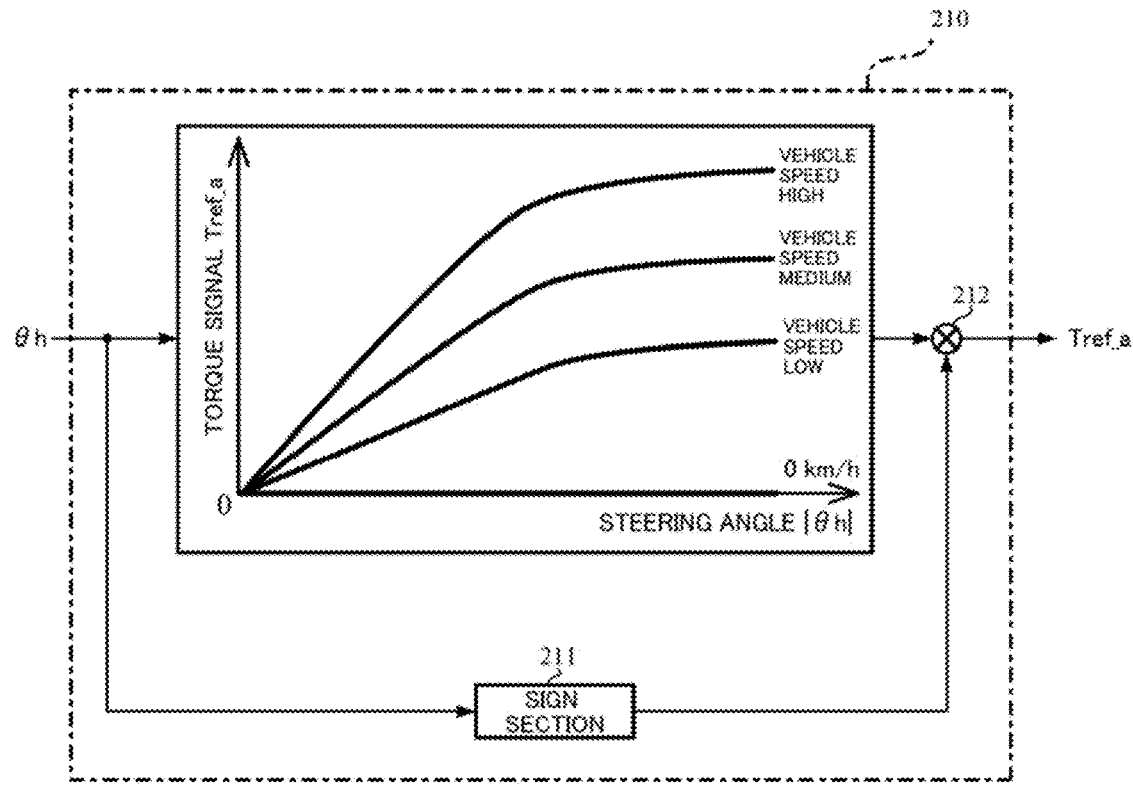
FIGS. 6A and 6B are a diagram showing a characteristic example of a basic map.
Figure 6B:
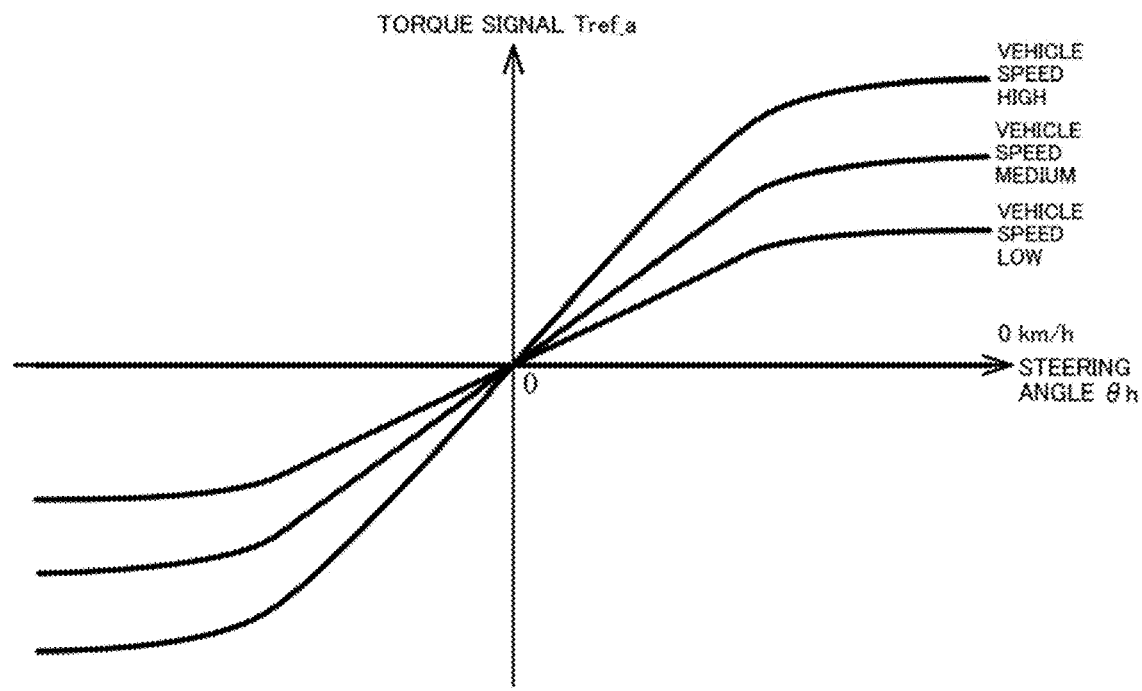

The basic map section 210 has a basic map and outputs a torque signal (the second torque signal) Tref_a whose parameter is the vehicle speed Vs using the basic map. The basic map is adjusted by a tuning. For example, as shown in FIG. 6A, the torque signal Tref_a increases when the magnitude (the absolute value) |$\theta h$| of the steering angle $\theta h$ increases, is zero when the vehicle speed Vs is 0 [km/h] and increases when the vehicle speed Vs increases. In FIG. 6A, the sign section 211 outputs the sign ("+1" or "−1") of the steering angle $\theta h$ to the multiplying section 212, the magnitude of the torque signal Tref_a is obtained by the basic map from the magnitude of the steering angle $\theta h$, and the torque signal Tref_a is calculated by multiplying the magnitude of the torque signal Tref_a by the sign of the steering angle $\theta h$. As shown in FIG. 6B, the basic map may change the behavior in a case that the steering angle $\theta h$ is a positive value or a negative value. The basic map shown in FIGS. 6A and 6B is sensitive to the vehicle speed. However, the basic map may not be sensitive to the vehicle speed. When the vehicle speed Vs is zero, the torque signal Tref_a may not be zero and have an infinitesimal value.

The differential section 220 differentiates the steering angle θh and calculates a steering angular velocity ωh, and the steering angular velocity ωh is inputted into the multiplying section 250.

Figure 7:
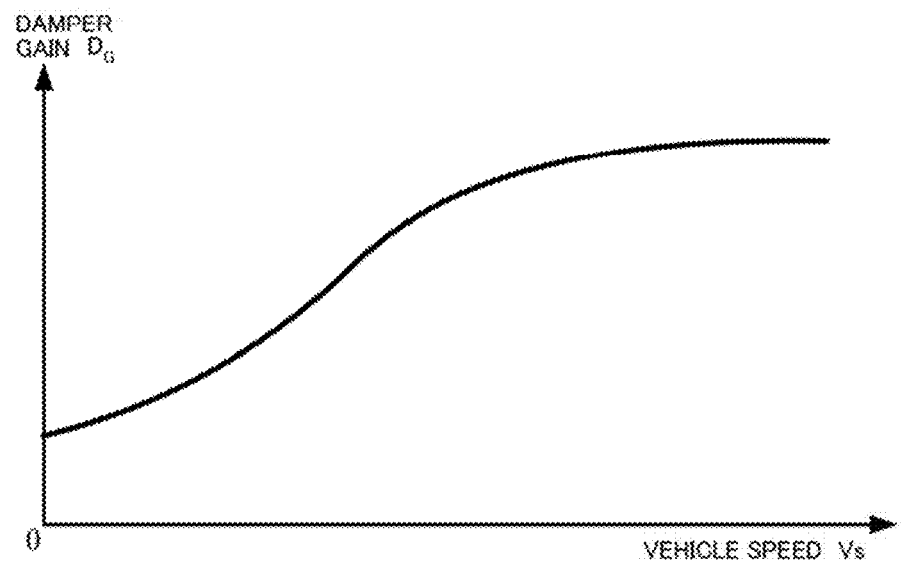
FIG. 7 is a diagram showing a characteristic example of a damper gain map.

The damper gain section 230 outputs a damper gain $D_G$ which is multiplied by the steering angular velocity ωh. The steering angular velocity ωh which is multiplied by the damper gain $D_G$ at the multiplying section 250 is inputted into the adding section 252 as the torque signal (the third torque signal) Tref_b. The damper gain $D_G$ is obtained by using a vehicle speed sensitive-type damper gain map that the damper gain section 230 has, depending on the vehicle speed Vs. For example, as shown in FIG. 7, the damper gain map has a characteristic that a value becomes larger when the vehicle speed Vs is higher. The damper gain map may be variable depending on the steering angle θh. The damper calculating section comprises the damper gain section 230 and the multiplying section 250.

Figure 8:
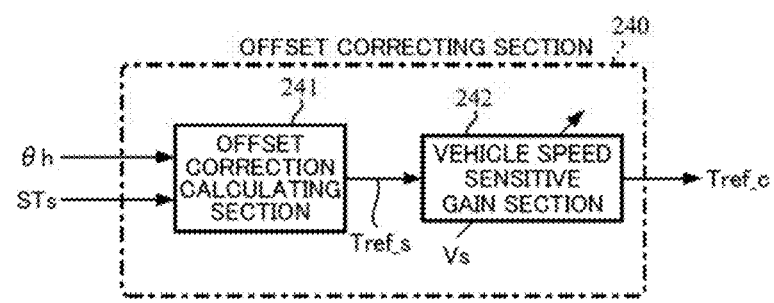
FIG. 8 is a block diagram showing a configuration example of an offset correcting section.

The offset correcting section 240 calculates the torque signal (the first torque signal) Tref_c to suppress the occurrence of the assist due to the offset value of the steering torque in the static steering state (the steering when the vehicle speed is 0 [km/h]). In a case that the driver does not grip the handle and the offset value is included in the detected steering torque, when the target steering torque is set to 0 [Nm] in the static steering state, there can be the occurrence of the assist because the offset value is existed. The characteristic depending on the steering angle θh is set based on this offset value (hereinafter, referred to as "an offset countermeasure characteristic"). The torque signal Tref_c is calculated by using the offset countermeasure characteristic. FIG. 8 shows a configuration example of the offset correcting section 240, and the offset correcting section 240 comprises an offset correction calculating section 241 and a vehicle speed sensitive gain section 242.

Figure 9:
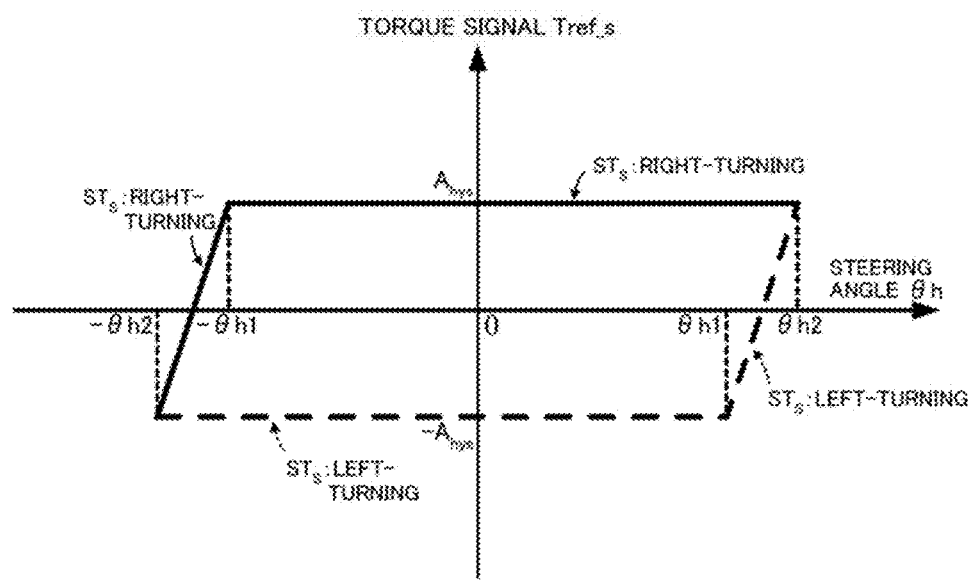
FIG. 9 is a diagram showing a characteristic example of the offset correcting section.

The offset correction calculating section 241 defines the offset countermeasure characteristic as a hysteresis characteristic shown in FIG. 9, and calculates the torque signal (the basic torque signal) Tref_s based on the steering angle θh and the steering state STs. In FIG. 9, a horizontal axis is the steering angle θh [deg], a vertical axis is the torque signal Tref_s [Nm], "$A_{hys}$" is a hysteresis width, the solid line shows the characteristic in a case of the right-turning steering, and the broken line shows the characteristic in a case of the left-turning steering. FIG. 9 shows an example that the steering direction is changed from the right-turning steering to the left-turning steering at the steering angle (+θh2) and the steering direction is changed from the left-turning steering to the right-turning steering at the steering angle (−θh2). As shown in FIG. 9, in a case of the right-turning steering, the torque signal Tref_s has a constant value $A_{hys}$ when the steering angle is between "−θh1" and "θh2" and changes with a constant rate whose gradient "a"=$2A_{hys}/(θh2−θh1)$ when the steering angle is between "−θh2" and "−θh1". In a case of the left-turning steering, the torque signal Tref_s has a constant value −$A_{hys}$ which is a negative value of the hysteresis width $A_{hys}$ when the steering angle is between "θh1" and "−θh2" and changes with the gradient "a" when the steering angle is between "θh2" and "−θh1". In order to suppress the occurrence of the assist due to the offset value of the steering torque, the value of the hysteresis width $A_{sys}$ is set to be larger than the offset value. The offset countermeasure characteristic may have a hysteresis characteristic which is changed not in a linear manner shown in FIG. 9 but in a curved manner (a nonlinear manner). In FIG. 9, the symmetric hysteresis characteristic is formed between the right-turning steering and the left-turning steering. A non-symmetric hysteresis characteristic may be used. For example, in a case that the offset value of the right-turning steering is different from that of the left-turning steering, the non-symmetric hysteresis characteristic is adopted.

Figure 10:
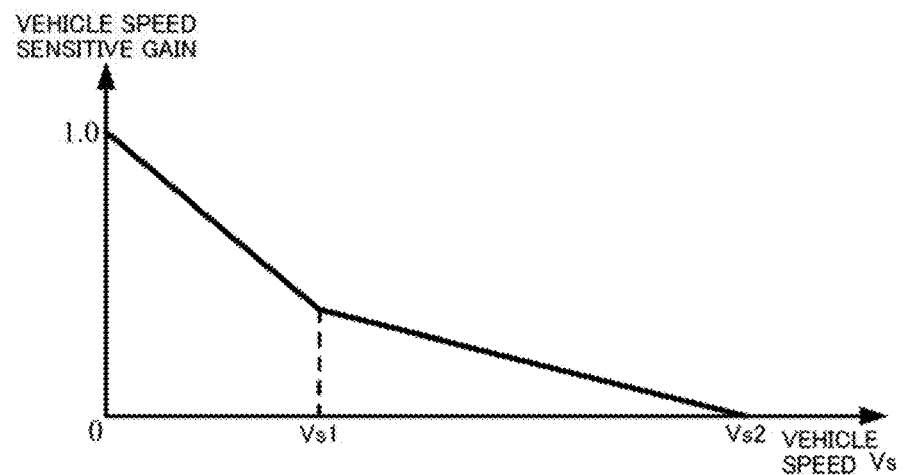
FIG. 10 is a diagram showing a characteristic example of a vehicle speed sensitive gain.

The vehicle speed sensitive gain section 242 outputs the torque signal Tref_c by multiplying the torque signal Tref_s by the vehicle speed sensitive gain. The vehicle speed sensitive gain is set to become smaller when the vehicle speed Vs becomes higher. For example, as shown in FIG. 10, the vehicle speed sensitive gain is set to "1.0" when the vehicle speed is 0 [km/h] (the vehicle is in a stop state). The vehicle speed sensitive gain becomes smaller with a constant rate when the vehicle speed Vs becomes higher. When the vehicle speed Vs becomes Vs1 (for example, 2 [km/h]), the decrease rate of the vehicle speed sensitive gain is set to a smaller value. When the vehicle speed Vs becomes Vs2 (for example, 6 [km/h]), the vehicle speed sensitive gain is set to zero. The value of the vehicle speed sensitive gain when the vehicle speed Vs is 0 [km/h] may be a value other than "1.0", the number of the portions where the decrease rate of the vehicle speed sensitive gain is changed may be plural, and the vehicle speed sensitive gain may be changed not in a linear manner but in a curved manner (a nonlinear manner).

Thus, the offset countermeasure characteristic has a hysteresis characteristic by the offset correction calculating section 241 and is sensitive to the vehicle speed due to the vehicle sensitive gain section 242. Thereby, the torque signal Tref_c which reduces the affection due to the offset value is generated and the occurrence of the assist due to the offset value of the steering torque can be suppressed by the torque signal Tref_c. Instead of using the vehicle speed sensitive gain section 242, the hysteresis width $A_{hys}$ may be variable depending on the vehicle speed Vs and then the offset countermeasure characteristic may be sensitive to the vehicle speed. In this case, the vehicle speed sensitive gain section 242 is not needed. The characteristic other than the hysteresis characteristic may be used as the offset countermeasure characteristic.

The torque signals Tref_c and Tref_b are added at the adding section 252, the added torque signal and the torque signal Tref_a are added at the adding section 251 and the added result is outputted as the target steering torque Tref.

The steering angular velocity ωh is calculated by differentiating the steering angle θh and the appropriate low pass filter (LPF) process is performed to the steering angular velocity ωh for reducing the affection of the noise in the high frequency region. The processes of the high pass filter (HPF) and the gain may use in place of those of the differential calculation and the LPF. Further, the steering angular velocity ωh may be calculated by differentiating not the steering angle θh but the handle angle $θ_1$ which is detected by the upper-side angle sensor or the column angle $θ_2$ which is detected by the lower-side angle sensor and performing the LPF process to the differentiation result. The motor angular velocity ωm may be used as the angular velocity information instead of the steering angle ωh. In this case, the differential section 220 is not needed.

The converting section 400 has a characteristic of "−1/Kt" which is sign-inverted with respect to a reciprocal of the spring constant Kt of the torsion bar 2A, and converts the target steering torque Tref into the target torsional angle Δθref.

Figure 11:
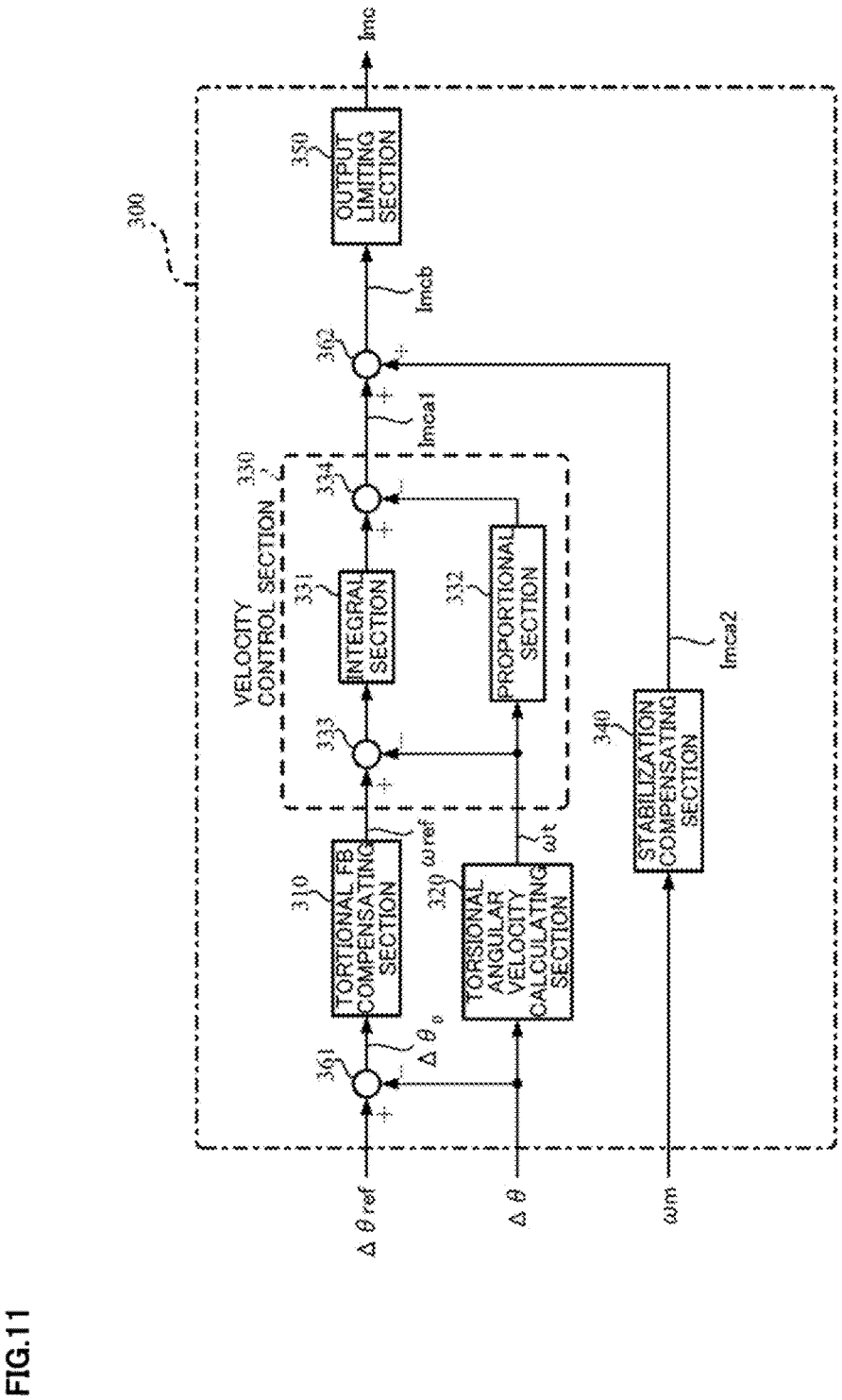
FIG. 11 is a block diagram showing a configuration example of a torsional angle control section.

The torsional angle control section 300 calculates the motor current command value Imc based on the target torsional angle Δθref, the torsional angle Δθ and the motor angular velocity ωm. FIG. 11 is a block diagram showing a configuration example of the torsional angle control section 300, and the torsional angle control section 300 comprises a torsional angle feed-back (FB) compensating section 310, a torsional angular velocity calculating section 320, a velocity control section 330, a stabilization compensating section 340, an output limiting section 350, a subtracting section 361 and an adding section 362. The target torsional angle Δθref outputted from the converting section 400 is addition-inputted into the subtracting section 361, the torsional angle Δθ is subtraction-inputted into the subtracting section 361 and is inputted into the torsional angular velocity calculating section 320, and the motor angular velocity ωm is inputted into the stabilization compensating section 340.

A deviation $\Delta\theta_0$ between the target torsional angle Δθref and the torsional angle Δθ is calculated at a subtracting section 361. The torsional angle FB compensating section 310 multiplies the deviation $\Delta\theta_0$ by a compensation value $C_{FB}$ (a transfer function), and outputs a target torsional angular velocity ωref so as to follow-up the torsional angle Δθ to the target torsional angle Δθref. The compensation value $C_{FB}$ may be a simple gain Kpp or a compensation value which is generally used, such as a PI-control compensation value. The target torsional angular velocity ωref is inputted into the velocity control section 330. It is possible to follow-up the torsional angle Δθ to the target torsional angle Δθref and obtain the desired steering torque by the torsional angle FB compensating section 310 and the velocity control section 330.

The torsional angular velocity calculating section 320 calculates the torsional angular velocity ωt by differentiating the torsional angle Δθ, and the torsional angular velocity ωt is inputted into the velocity control section 330. A pseudo differential which uses the HPF and the gain may be used as the differential operation. The torsional angular velocity ωt may be calculated from other schemes using the torsional angle Δθ or the schemes not using the torsional angle Δθ and then may be inputted into the velocity control section 330.

The velocity control section 330 calculates the motor current command values Imca1 so as to follow-up the torsional angular velocity ωt to the target torsional angular velocity ωref by a proportional preceding-type PI-control (I-P control). A difference (ωref−ωt) between the target torsional angular velocity ωref and the torsional angular velocity ωt is calculated at the subtracting section 333. The difference is integrated at the integral section 331 having the gain Kvi, and the integral result is addition-inputted into the subtracting section 334. The torsional angular velocity ωt is also inputted into the proportional section 332, the proportional process using the gain Kvp is performed to the torsional angular velocity ωt, and the proportional-calculated result is subtraction-inputted into the subtracting section 334. As well, the subtracted result at the subtracting section 334 is outputted as the motor current command value Imca1. The velocity control section 330 may calculate the motor current command value Imca1 by not using the I-P control but using the generally used control method such as the PI-control, a proportional (P) control, a proportional integral derivative (PID) control, a derivative preceding-type PID control (a PI-D control), a model matching control or a model reference control.

The stabilization compensating section 340 has the compensation value Cs (the transfer function) and calculates the motor current command value Imca2 from the motor angular velocity ωm. In order to improve the followability and the external disturbance characteristic, when the gains of the torsional angle FB compensating section 310 and the velocity control section 330 increase, the oscillation phenomenon due to the control in the high frequency region is occurred.

As this countermeasure, the transfer function (Cs) to the motor angular velocity ωm, which is required for the stabilization, is disposed in the stabilization compensating section 340. Thereby, the stabilization of the overall EPS control system can be realized. The primary filter which is set by the gain and the pseudo differential whose structure is, for example, the primary HPF, is represented by the following Expression 3 and is used as the transfer function (Cs) of the stabilization compensating section 340.

$$C_s = K_{sta} \frac{\frac{1}{2\pi f_c}s}{\frac{1}{2\pi f_c}s + 1} \qquad \text{[Expression 3]}$$

Here, "$K_{sta}$" is a gain, "fc" is a cutoff frequency and "s" is a Laplace operator. For example, the cutoff frequency fc is set to 150 [Hz]. The secondary filter, the fourth order filter or the like may be used as the transfer function.

The motor current command value Imca1 from the velocity control section 330 and the motor current command value Imca2 from the stabilization compensating section 340 are added at the adding section 362, and the added result is outputted as the motor current command value Imcb.

Figure 12:
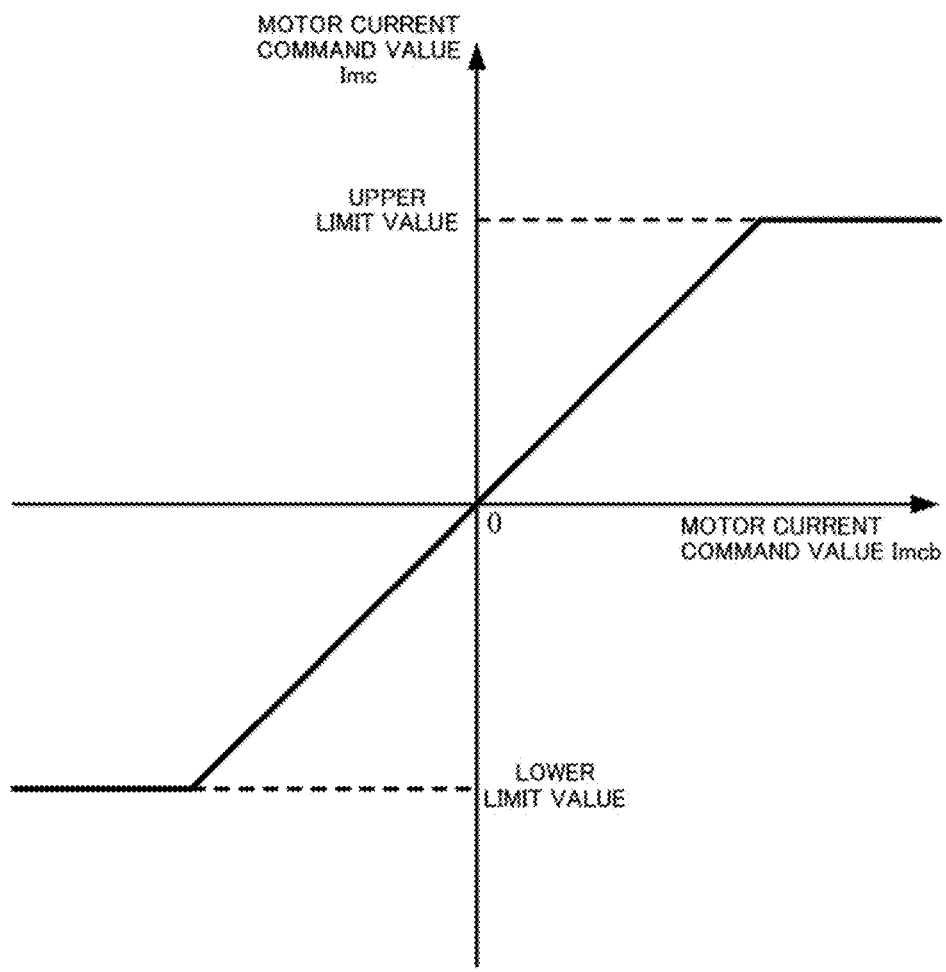
FIG. 12 is a diagram showing a setting example of upper and lower limit values at an output limiting section.

The output limiting section 350 limits the upper and lower limit values of the motor current command value Imcb and outputs the motor current command value Imc. As shown in FIG. 12, the upper limit value and the lower limit value to the motor current command value are preliminarily set. The output limiting section 350 outputs the upper limit value when the inputted motor current command value Imcb is equal to or larger than the upper limit value, the lower limit value when the inputted motor current command value Imcb is equal to or smaller than the lower limit value and the motor current command value Imcb when the inputted motor current command value Imcb is smaller than the upper limit value and is larger than the lower limit value, as the motor current command value Imc.

In such a configuration, the operation example of the present embodiment will be described with reference to flowcharts of FIG. 13 to FIG. 15.

When the operation is started, the motor angular velocity ωm is inputted into the right-turning/left-turning judging section 500, and the right-turning/left-turning judging section 500 judges whether the steering is the right-turning or the left-turning based on the sign of the motor angular velocity ωm, and outputs the judged result as the steering state STs to the target steering torque generating section 200 (Step S10).

The target steering torque generating section 200 inputs the steering state STs, the steering angle θh and the vehicle speed Vs, and generates the target steering torque Tref (Step S20). The operation example of the target steering torque generating section 200 will be described with reference to the flowchart of FIG. 14.

The steering angle θh inputted into the target steering torque generating section 200 is inputted into the basic map section 210, the differential section 220 and the offset correcting section 240. The steering state STs is inputted into the offset correcting section 240. The vehicle speed Vs is inputted into the basic map section 210, the damper gain section 230 and the offset correcting section 240 (Step S21).

The basic map section 210 generates the torque signal Tref_a depending on the steering angle θh and the vehicle speed Vs by using the basic map as shown in FIG. 6A or FIG. 6B, and outputs the torque signal Tref_a to the adding section 251 (Step S22).

The differential section 220 differentiates the steering angle θh and outputs the steering angular velocity ωh (Step S23). The damper gain section 230 outputs the damper gain $D_G$ depending on the vehicle speed Vs by using the damper gain map as shown in FIG. 7 (Step S24). The multiplying section 250 calculates the torque signal Tref_b by multiplying the steering angular velocity ωh by the damper gain $D_G$, and outputs the torque signal Tref_b to the adding section 252 (Step S25).

In the offset correcting section 240, the steering angle θh and the steering state STs are inputted into the offset correction calculating section 241, and the vehicle speed Vs is inputted into the vehicle speed sensitive gain section 242. The offset correction calculating section 241 performs the hysteresis correction to the steering angle θh depending on the steering state STs by using the offset countermeasure characteristic as shown in FIG. 9 (Step S26), generates the torque signal Tref_s and outputs the torque signal Tref_s to the vehicle speed sensitive gain section 242. The vehicle speed sensitive gain section 242 determines the vehicle speed sensitive gain depending on the vehicle speed Vs by using the characteristic as shown in FIG. 10, multiplies the torque signal Tref_s by the vehicle speed sensitive gain and outputs the multiplication result as the torque signal Tref_c to the adding section 252 (Step S27). The offset countermeasure characteristic at the offset correction calculating section 241 may define by using the hysteresis width $A_{hys}$, and the steering angles θh1 and θh2, or may define by using the hysteresis width $A_{hys}$ and the gradient "a" instead of the steering angles θh1 and θh2.

The torque signals Tref_b and Tref_c are added at the adding section 252, the added result and the torque signal Tref_a are added at the adding section 251, and the target steering torque Tref is calculated (Step S28).

The target steering torque Tref which is generated at the target steering torque generating section 200 is inputted into the converting section 400, and is converted into the target torsional angle Δθref at the converting section 400 (Step S30). The target torsional angle Δθref is inputted into the torsional angle control section 300.

The torsional angle control section 300 inputs the target torsional angle Δθref, the torsional angle Δθ and the motor angular velocity ωm, and calculates the motor current command value Imc (Step S40). The operation example of the torsional angle control section 300 will be described with reference to the flowchart of FIG. 15.

The target torsional angle Δθref which is inputted into the torsional angle control section 300 is inputted into the subtracting section 361, the torsional angle Δθ is inputted into the subtracting section 361 and the torsional angular velocity calculating section 320, and the motor angular velocity ωm is inputted into the stabilization compensating section 340 (Step S41).

In the subtracting section 361, the deviation $Δθ_0$ is calculated by subtracting the torsional angle Δθ from the target torsional angle Δθref (Step S42). The deviation $Δθ_0$ is inputted into the torsional angle FB compensating section 310, and the torsional angle FB compensating section 310 compensates the deviation $Δθ_0$ by multiplying the deviation $Δθ_0$ by the compensation value $C_{FB}$ (Step S43), and outputs the target torsional angular velocity ωref to the velocity control section 330.

The torsional angular velocity calculating 320 inputs the torsional angle Δθ, calculates the torsional angular velocity ωt by differentiating the torsional angle Δθ (Step S44), and outputs the torsional angular velocity ωt to the velocity control section 330.

In the velocity control section 330, the difference between the target torsional angular velocity ωref and the torsional angular velocity ωt is calculated at the subtracting section 333 and is integrated (Kvi/s) at the integral section 331, and the integral result is addition-inputted into the subtracting section 334 (Step S45). Further, a proportional process (Kvp) is performed to the torsional angular velocity ωt at the proportional section 332, and the proportional result is subtraction-inputted into the subtracting section 334 (Step S45). The motor current command value Imca1 which is the subtracted result of the subtracting section 334 is outputted from the subtracting section 334, and is inputted into the adding section 362.

The stabilization compensating section 340 performs the stabilization compensation to the inputted motor angular velocity ωm by using the transfer function Cs which is represented by the Expression 3 (Step S46), and the motor current command value Imca2 from the stabilization compensating section 340 is inputted into the adding section 362.

The motor current command values Imca1 and Imca2 are added at the adding section 362 (Step S47). The motor current command value Imcb which is the added result is inputted into the output limiting section 350. The output limiting section 350 limits the upper and lower limit values of the motor current command value Imcb by using the preliminarily set upper limit value and the lower limit value (Step S48) and outputs the limited value as the current command value Imc (Step S49).

The motor is driven based on the motor current command value Imc outputted from the torsional angle control section 300, and the current control is performed (Step S50).

Figure 13:
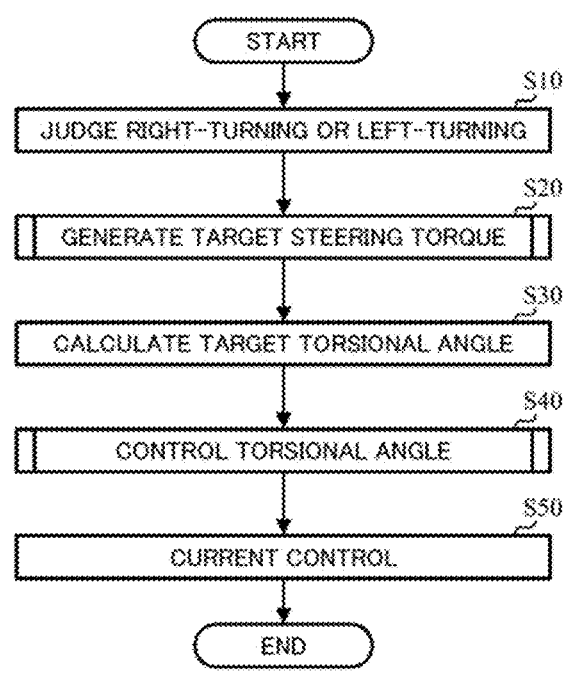
FIG. 13 is a flowchart showing an operation example of the present invention (the first embodiment)
Figure 14:
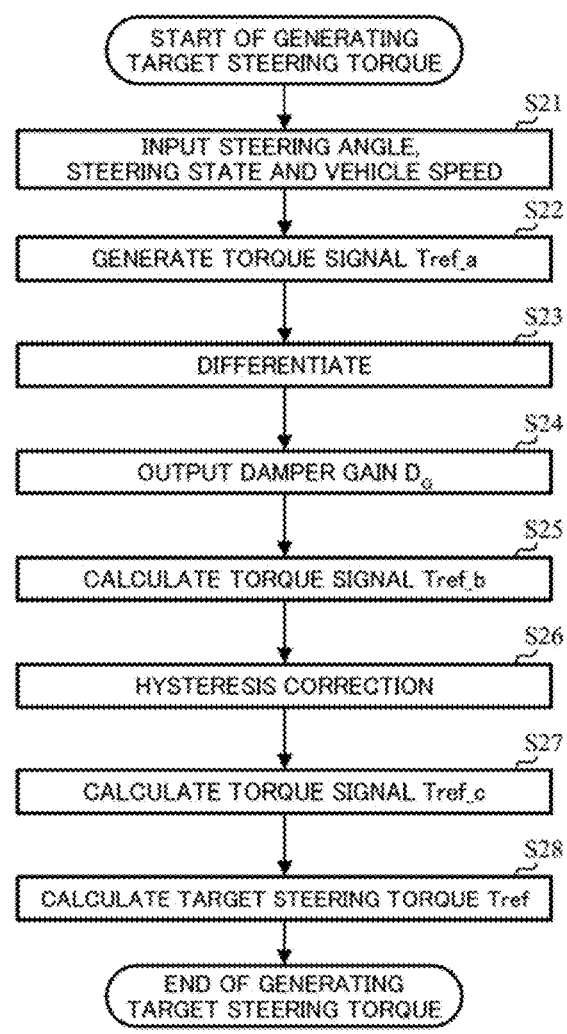
FIG. 14 is a flowchart showing an operation example of the target steering torque generating section (the first embodiment)
Figure 15:
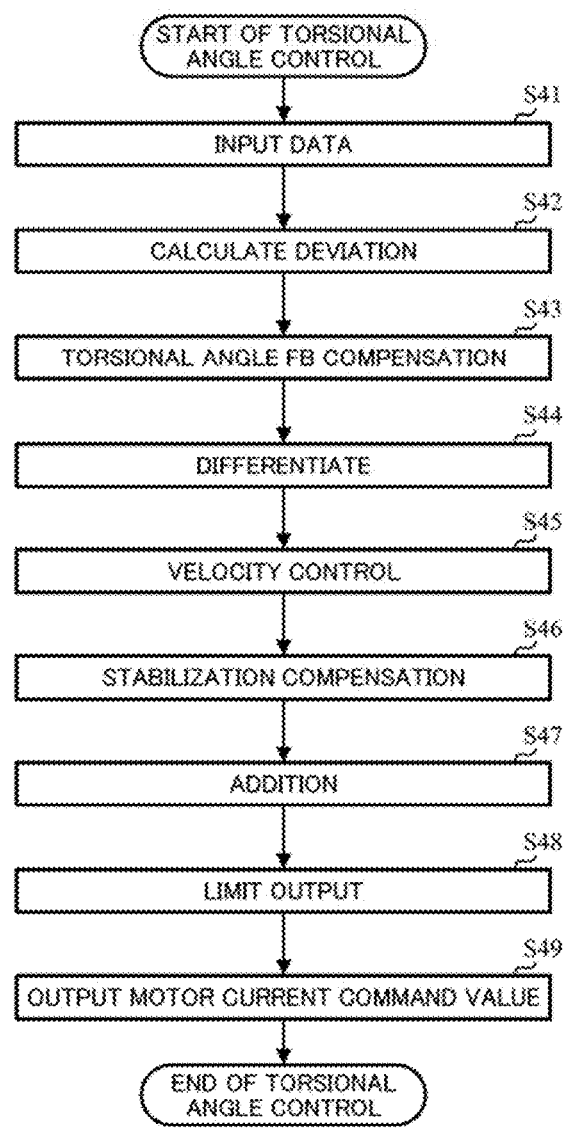
FIG. 15 is a flowchart showing an operation example of the torsional angle control section.

In FIG. 13 to FIG. 15, the orders of inputting the data, the calculation and so on are appropriately changeable.

The effects of the offset correcting section of the present embodiment will be described based on the simulation results.

In the simulations, it is assumed that the offset with 0.05 [Nm] is generated to the steering torque detected at the torsion bar. Further, assuming that the steering is the static steering, the basic map that the vehicle speed Vs is 0 [km/h] is used. Therefore, the value of the torque signal Tref_a outputted from the basic map section 210 is 0 [Nm]. The differential section 220 performs the pseudo differential using the HPF and the gain as the differential operation.

First, in a case of "without the correction by the offset correcting section", the simulation results of the time responses of the steering angle and the steering torque will be described.

Figure 16A:
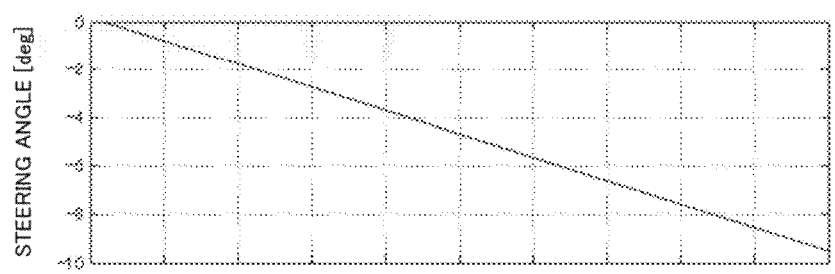
FIGS. 16A and 16B are a graph showing an example of time response of a steering angle and a steering torque when the correction by the offset correcting section is not performed in a simulation showing an effect of the offset correcting section.
Figure 16B:
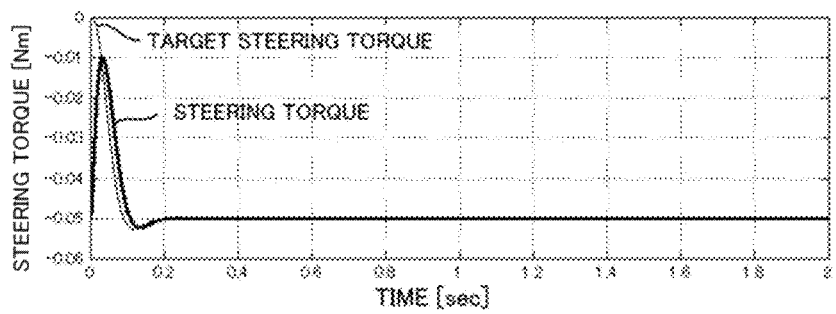

The simulation results are shown in FIGS. 16A and 16B. In FIGS. 16A and 16B, the horizontal axis denotes a time [sec]. The vertical axis denotes the steering angle [deg] in FIG. 16A and the steering torque [Nm] in FIG. 16B. FIG. 16A shows the time response of the steering angle whose initial value is 0 [deg]. FIG. 16B shows the time response of the target steering torque by a thin line and the time response of the detected steering torque by a bold line. The target steering torque is started from 0 [Nm] and the steering torque is started from −0.05 [Nm]. Since the steering torque whose magnitude of the offset is 0.05 [Nm] is adjusted so as to follow-up the target steering torque 0 [Nm] by the torsional angle control at the torsional angle control section 300, the time response is shown in FIG. 16B. As a result, the assist due to the offset value of the steering torque is occurred and the steering angle is varied as shown in FIG.

16A. That is, the steering torque does not become 0.0 [Nm] in a no-grip state because of existing the offset value, and the torsional angle control serves so as to follow-up the torsional angle to the target torsional angle. Thereby, it is estimated that the variation of the steering angle is occurred due to the offset value of the steering torque.

Next, in a case of "with the correction by the offset correcting section", the simulation results of the time responses of the steering angle and the steering torque will be described. In this simulation, the gradient "a" in this offset countermeasure characteristic is set to 0.1 [Nm/deg].

Figure 17A:
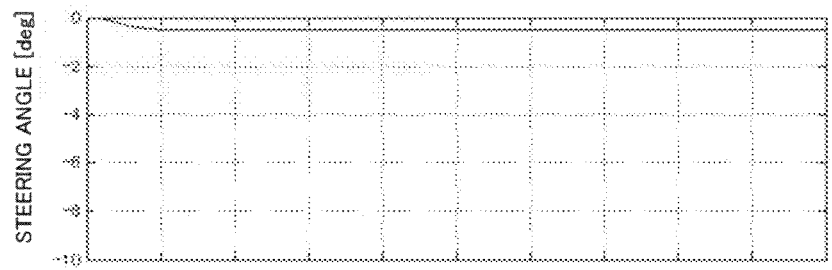
FIGS. 17A and 17B are a graph showing an example of time response of the steering angle and the steering torque when the correction by the offset correcting section is performed in the simulation showing an effect of the offset correcting section.
Figure 17B:
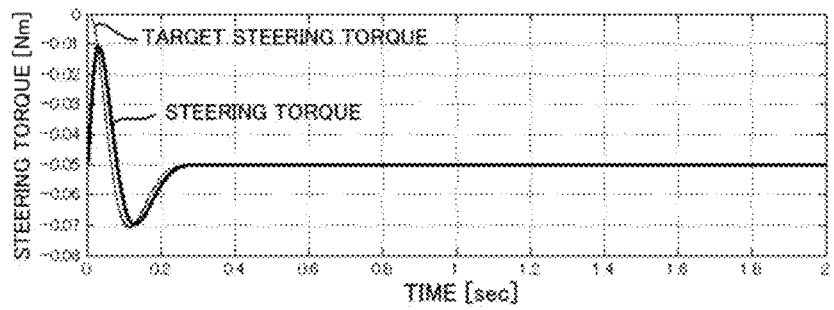

The simulation results are shown in FIGS. 17A and 17B. The settings of the axes and so on in FIGS. 17A and 17B are the same as those in FIGS. 16A and 16B. From FIG. 17A, the steering angle is slightly varied in the initial stage by performing the correction at the offset correcting section. Then, it is understood that the steering angle balances at 0.5 [deg] obtained by dividing the offset value 0.05 [Nm] by the gradient "a" (=0.1 [Nm/deg]) and the handle is in the holding state. That is, the occurrence of the assist due to the offset value of the steering torque is suppressed by the correction at the offset correcting section.

Figure 18:
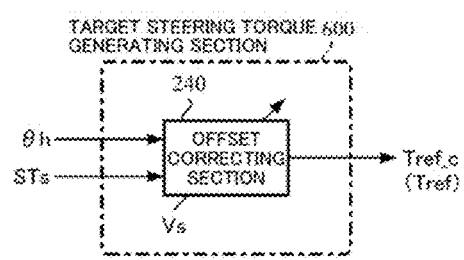
FIG. 18 is a flowchart showing an operation example of the target steering torque generating section (the second embodiment)

Although the target steering torque generating section 200 according to the first embodiment comprises the basic map section 210, the damper calculating section (including the damper gain section 230 and the multiplying section 250) and the offset correcting section 240, the target steering torque generating section 200 may treat only the suppression of the assist occurrence due to the offset value of the steering torque, and may comprise only the offset correcting section 240. The configuration example of the target steering torque generating section in the above case (the second embodiment) is shown in FIG. 18. In the target steering torque generating section 600, the torque signal Tref_c outputted from the offset correcting section 240 is outputted as the target steering torque Tref. Moreover, the target steering torque generating section may comprise the basic map section 210 and the offset correcting section 240 or may comprise the damper calculating section and the offset correcting section 240.

Figure 2:
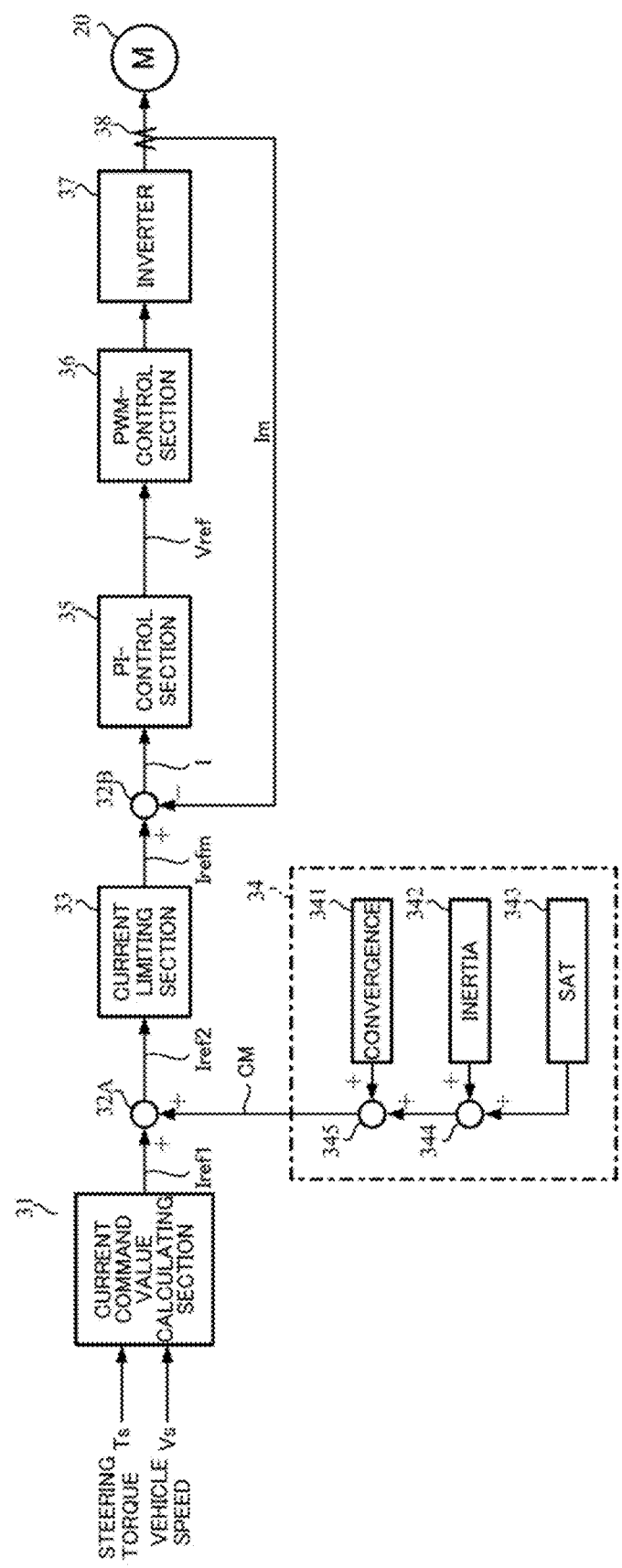
FIG. 2 is a block diagram showing a configuration example of a control unit (ECU) of the electric power steering apparatus.

The current command value which is calculated based on the steering torque in the conventional EPS (hereinafter, referred to as "an assist current command value") may be added to the motor current command value Imc outputted from the torsional angle control section according to the first and second embodiments. For example, the current command value Iref1 outputted from the current command value calculating section 31 shown in FIG. 2, the current command value Iref2 in which the compensation signal CM is added to the current command value Iref1, or the like may be added to the motor current command value Imc.

Figure 19:
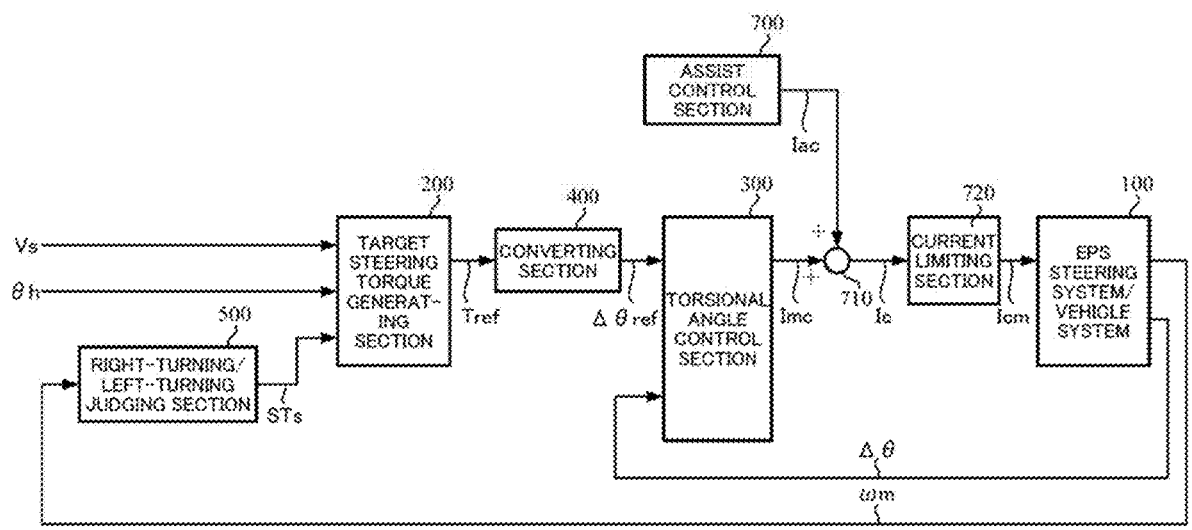
FIG. 19 is a block diagram showing a configuration example of the present invention (the third embodiment)

In contrast with the first embodiment, the configuration example in which the above function is included (the third embodiment) is shown in FIG. 19. The assist control section 700 comprises the current command value calculating section 31, or comprises the current command value calculating section 31, the compensation signal generating section 34 and the adding section 32A. The assist current command value Iac outputted from the assist control section 700 (corresponding to the current command value Iref1 or Iref2 in FIG. 2) and the motor current command value Imc outputted from the torsional angle control section 300 are added at an adding section 710 and the current command value Ic which is the added result is inputted into the current limiting section 720. The motor is driven based on the current command value Icm whose maximum current is limited and the current control is performed.

Figure 20A:
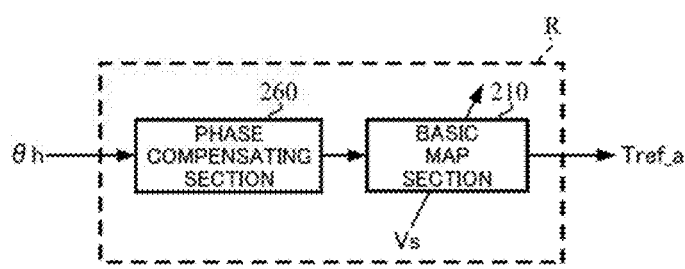
FIGS. 20A and 20B are a block diagram showing an insertion example of a phase compensating section.
Figure 20B:
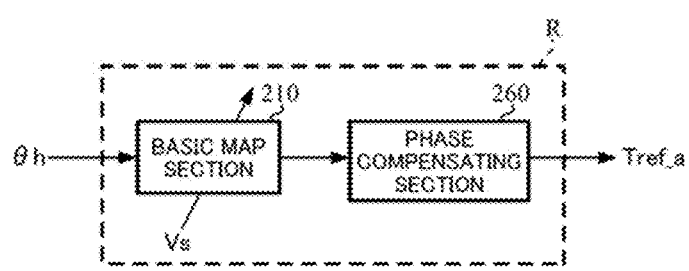

In the first to the third embodiments, the phase compensating section 260 may be provided at the previous stage of the basic map section 210 or the subsequent stage of the basic map section 210 in the target steering torque generating section 200 including the basic map section 210. That is, the configuration of the region R surrounded by the broken line in FIG. 5 may be changed to the configuration shown in FIG. 20A or FIG. 20B. The phase compensation at the phase compensating section 260 is set as the phase lead compensation. For example, in a case that the phase lead compensation using the primary filter in which the cutoff frequency of the numerator is set to 1.0 [Hz] and the cutoff frequency of the denominator is set to 1.3 [Hz] is performed, the comfortable steering feeling can be realized. If the target steering torque generating section has the configuration based on the steering angle, its configuration is not limited to the above configuration.

Further, in a case that the EPS control system is stable, the stabilization compensating section may be omitted. The output limiting section can also be omitted.

Figure 1:
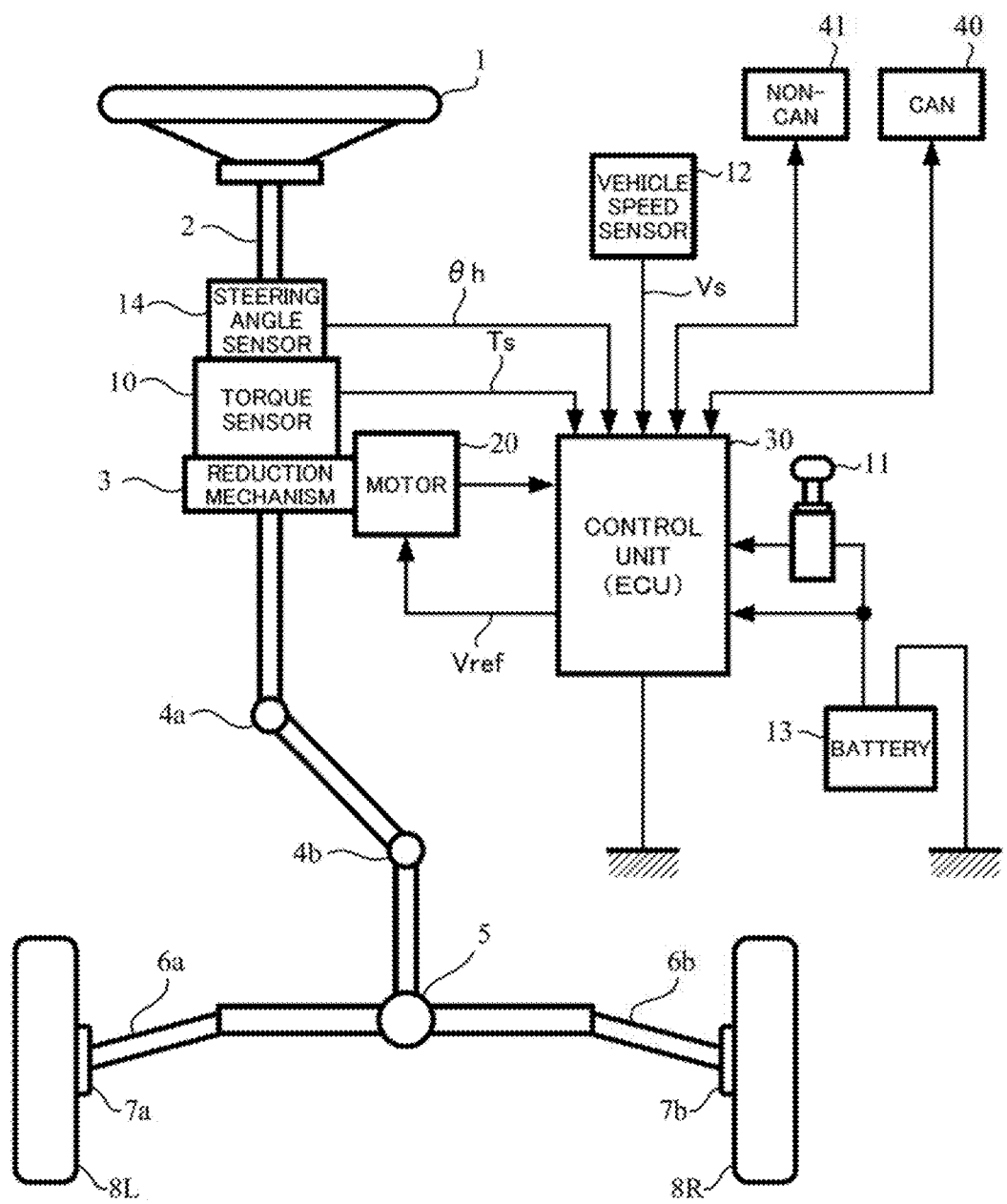
FIG. 1 is a configuration diagram illustrating a general outline of a conventional electric power steering apparatus (EPS)

In FIG. 1 and FIG. 3, although the present invention is applied to the column type EPS, the present invention is not limited to an upstream-type EPS such as the column type EPS, and can also be applied to a downstream-type EPS such as a rack and pinion type EPS. Further, from a viewpoint of performing the feed-back control based on the target torsional angle, the present invention can be applied to a steer-by-wire (SBW) reaction force unit which comprises at least the torsion bar having any spring constant and the sensor to detect the torsional angle. The embodiment (the fourth embodiment) in which the present invention is applied to the SBW reaction force unit including the torsion bar will be described.

Figure 21:
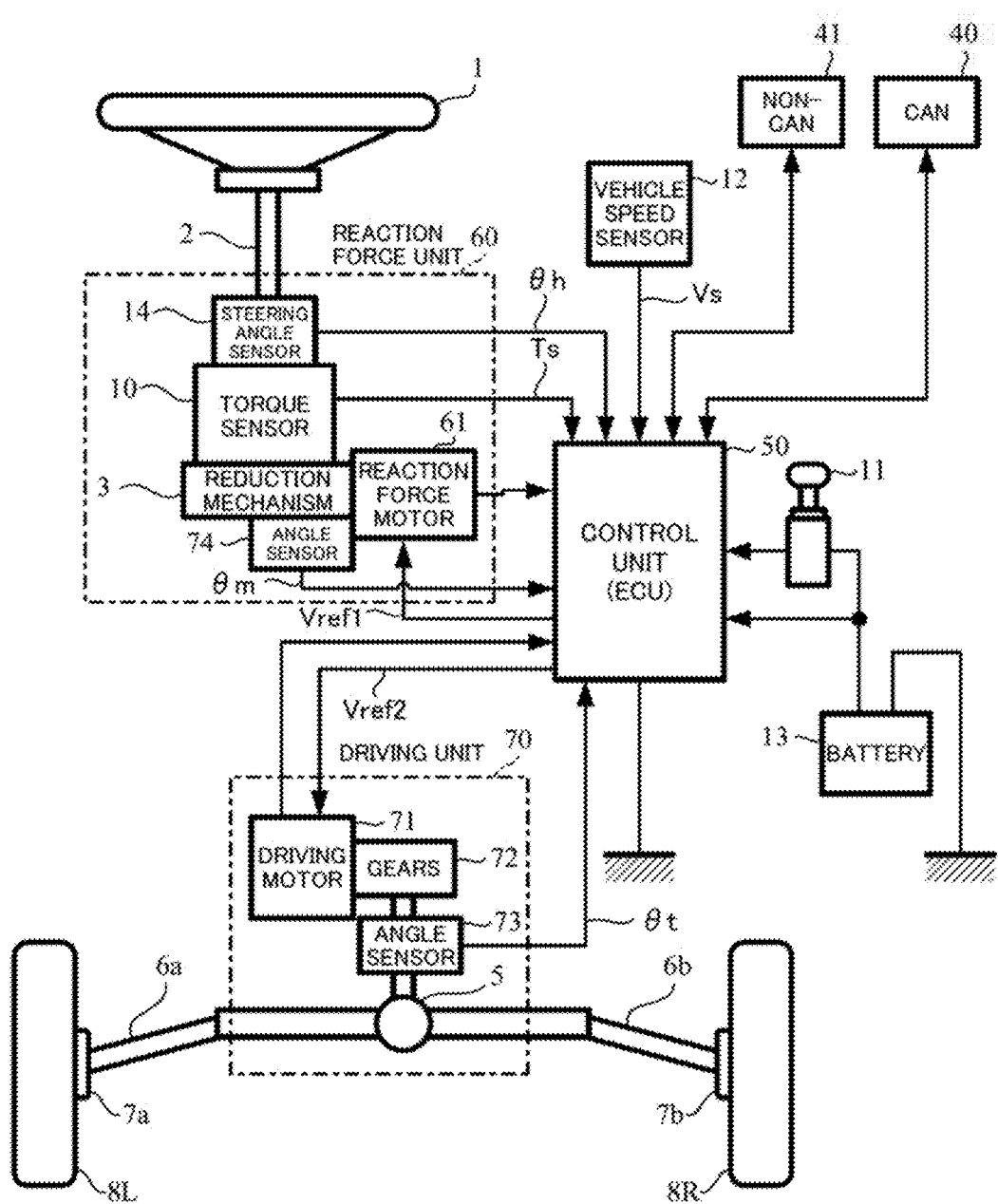
FIG. 21 is a configuration diagram illustrating a general outline of a steer-by-wire system (SBW system)

First, the overall SBW system including the SBW reaction force unit will be described. FIG. 21 shows a configuration example of the SBW system, corresponding to the general configuration of the electric power steering apparatus shown in FIG. 1. The same reference numerals designate the same components, and the detail explanation is omitted.

The SBW system does not have an intermediate shaft which is mechanically connected to the column shaft 2 at the universal joint 4a and is a system that the operation of the handle 1 is transmitted to the turning mechanism comprising the steered wheels 8L and 8R and so on by the electric signal. As shown in FIG. 21, the SBW system comprises the reaction force unit 60 and the driving unit 70, and the control unit (ECU) 50 controls the reaction force unit 60 and the driving unit 70. The reaction force unit 60 detects the steering angle θh by the steering angle sensor 14, and transmits the motion state of the vehicle transmitted from the steered wheels 8L and 8R as the reaction force torque to the driver. The reaction force torque is generated by the reaction force motor 61. Although the SBW system which does not comprise the torsion bar in the reaction force unit is existed, the SBW system which is applied to the present invention comprises the torsion bar and the steering torque Ts is detected by the torque sensor 10. The angle sensor 74 detects the motor angle θm of the reaction force motor 61. The driving unit 70 drives the driving motor 71 in harmony with the steering of the handle 1 by the driver. The driving force is applied to the pinion and rack mechanism 5 via the gears 72 and turns the steered wheels 8L and 8R via the tie rods 6a and 6b. The angle sensor 73 is disposed in the vicinity of the pinion and rack mechanism 5 and detects the turning angle θt of the steered wheels 8L and 8R. In order to cooperative-control the reaction force unit 60 and the driving unit 70, the ECU 50 generates the voltage control command value Vref1 to drive and control the reaction force motor 61 and the voltage control command value Vref2 to drive and control the driving motor 71 based on the information of the steering angle θh, the turning angle θt and so on outputted from the reaction force unit 60 and the driving unit 70, the vehicle speed Vs detected at the vehicle speed sensor 12 or the like.

The configuration of the fourth embodiment that the present invention is applied to such an SBW system will be described.

Figure 22:
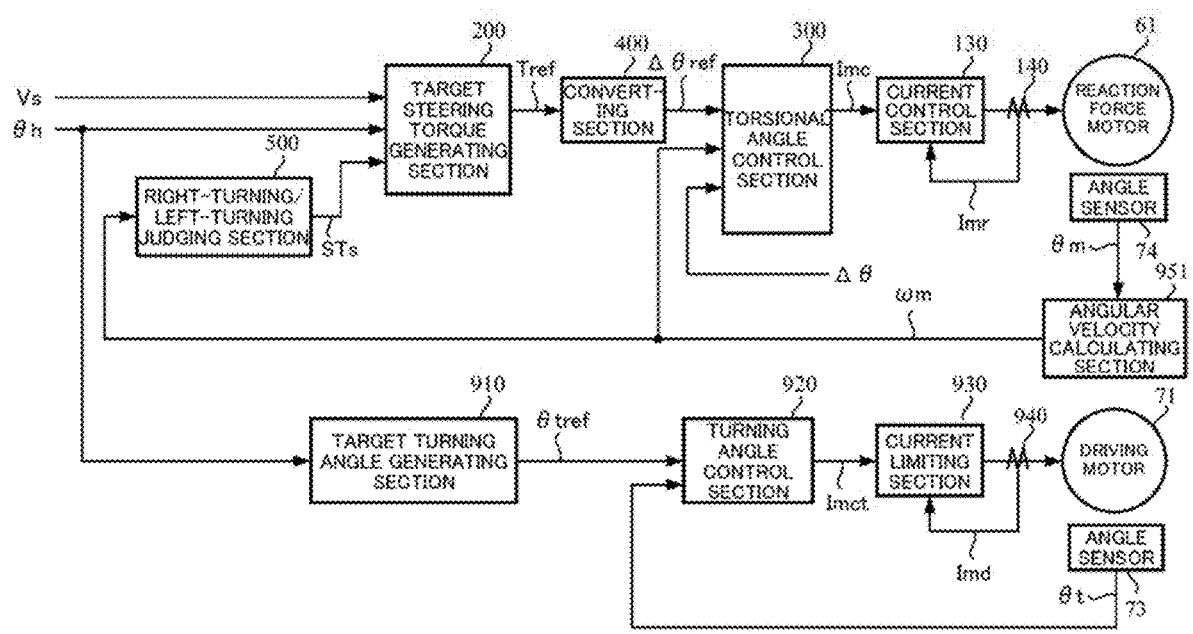
FIG. 22 is a block diagram showing a configuration example of the present invention (the fourth embodiment)

FIG. 22 is a block diagram showing the configuration of the fourth embodiment. In the fourth embodiment, the control to the torsional angle Δθ (hereinafter, referred to as "the torsional angle control") and the control to the turning angle θt (hereinafter, referred to as "the turning angle control") are performed. The reaction force unit is controlled by the torsional angle control and the driving unit is controlled by the turning angle control. The driving unit may be controlled by another control method.

In the torsional angle control, the configuration similar to that of the first embodiment is used and the operation similar to that of the first embodiment is performed. The control which follows-up the torsional angle Δθ to the target torsional angle Δθref which is calculated through the target steering torque generating section 200 and the converting section 400 by using the steering angle θh and so on, is performed. The motor angle θm is detected by the angle sensor 74, and the motor angular velocity ωm is calculated by differentiating the motor angle θm at the angular velocity calculating section 951. The turning angle θt is detected by the angle sensor 73. Although the detail explanation of the process in the EPS steering system/vehicle system 100 is not described in the first embodiment, the current control section 130 has the configuration similar to the combined configuration with the subtracting section 32B, the PI-control section 35, the PWM-control section 36 and the inverter 37 shown in FIG. 2, performs the operation similar to that of the above combined sections, drives the reaction force motor 61 based on the motor current command value Imc outputted from the torsional angle control section 300 and the current value Imr of the reaction force motor 61 detected by the motor current detector 140, and performs the current control.

In the turning angle control, the target turning angle θtref is generated based on the steering angle θh at the target turning angle generating section 910, the target turning angle θtref and the turning angle θt are inputted into the turning angle control section 920, and the turning angle control section 920 calculates the motor current command value Imct so as to follow-up the turning angle θt to the target turning angle θtref. The current control section 930 has the configuration similar to that of the current control section 130, performs the operation similar to that of the current control section 130, drives the driving motor 71 based on the motor current command value Imct and the current value Imd of the driving motor 71 detected by the motor current detector 940, and performs the current control.

Figure 23:
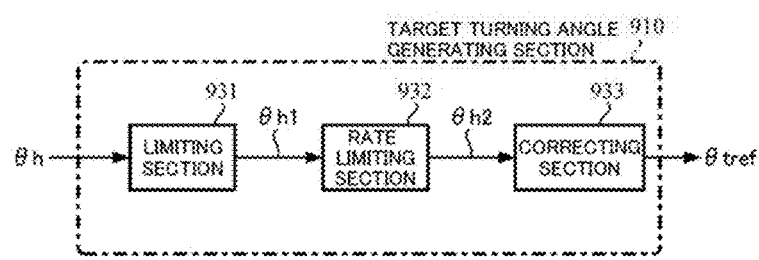
FIG. 23 is a block diagram showing a configuration example of a target steering angle generating section.

The configuration example of the target turning angle generating section 910 is shown in FIG. 23. The target turning angle generating section 910 comprises a limiting section 931, a rate limiting section 932 and a correcting section 933.

The limiting section 931 limits the upper and lower limit values of the steering angle θh and outputs the steering angle θh1. As well as the output limiting section 350 in the torsional control section 300, the upper limit value and the lower limit value to the steering angle θh are preliminarily set, and the steering angle θh is limited.

In order to avoid the sharp change of the steering angle, the rate limiting section 932 sets the limit value to the change amount of the steering angle θh1, limits the change amount of the steering angle θh1 and outputs the steering angle θh2. For example, the difference between the present steering angle θh1 and the steering angle θh1 prior to one sampling is set as the change amount. In a case that the absolute value of the change amount is larger than a predetermined value (the limit value), the addition operation or the subtraction operation is performed to the steering angle θh1 so that the absolute value of the change amount becomes the limit value, and the limited value is outputted as the steering angle θh2. In a case that the absolute value of the change amount is equal to or smaller than the limit value, the steering angle θh1 is outputted as the steering angle θh2. Instead of setting the limit value to the absolute value of the change amount, the change amount may be limited by setting the upper limit value and the lower limit value to the change amount. Instead of limiting the change amount, the limitation to the change rate or the difference rate may be performed.

The correcting section 933 corrects the steering angle θh2 and outputs the target turning angle θtref. For example, similar to the basic map section 210 in the target steering torque generating section 200, the target turning angle θtref is obtained by the steering angle θh2 using the map that defines the characteristic of the target turning angle θtref to the absolute value |θh2| of the steering angle θh2. Alternatively, the target steering angle θtref may simply be calculated by multiplying the steering angle θh2 by a predetermined gain.

Figure 24:
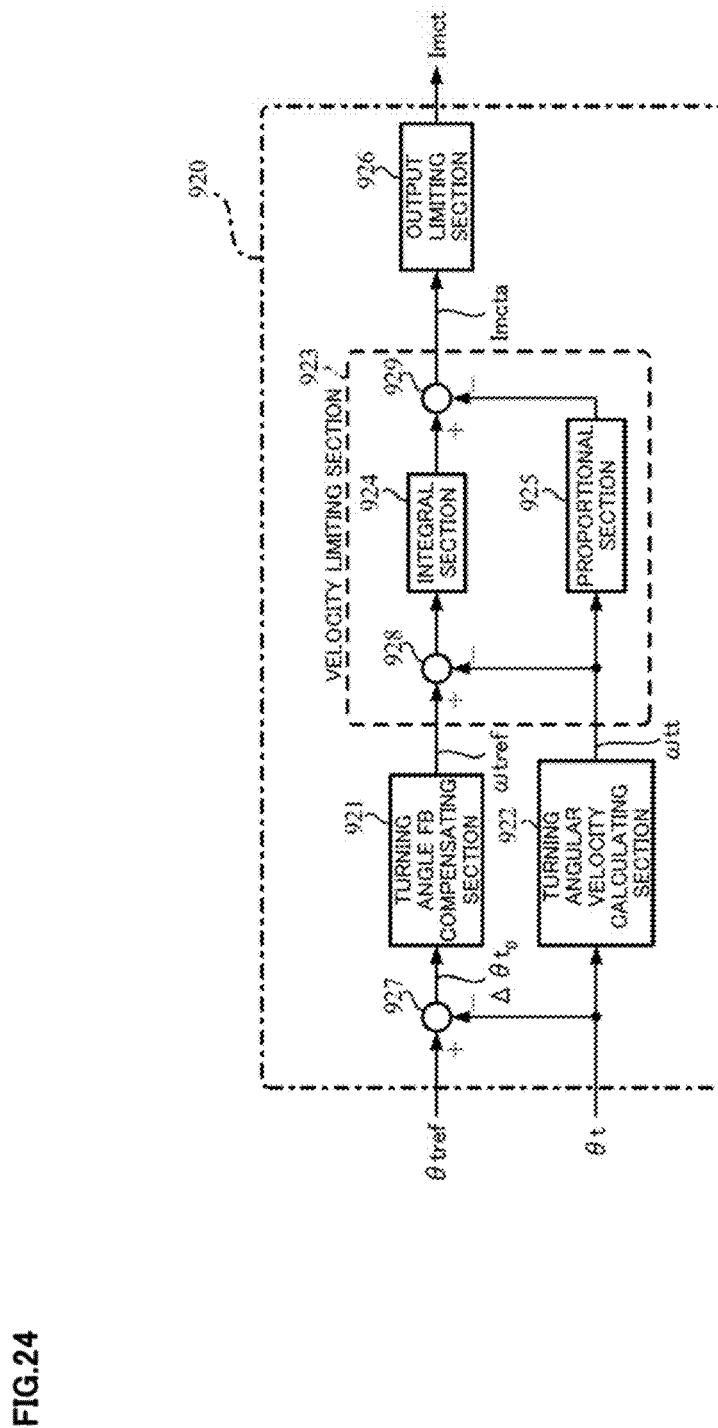
FIG. 24 is a block diagram showing a configuration example of a steering angle control section.

A configuration example of the turning angle control section 920 is shown in FIG. 24. The turning angle control section 920 has a configuration similar to the configuration example of the torsional angle control section 300 shown in FIG. 11 excluding the stabilization compensating section 340 and the adding section 362. Instead of the target torsional angle Δθref and the torsional angle Δθ, the target turning angle θtref and the turning angle θt are inputted into the turning angle control section 920. A turning steering angle feed-back (FB) compensating section 921, a turning angular velocity calculating section 922, the velocity control section 923, the output limiting section 926 and the subtracting section 927 have the configuration similar to and are performed the operation similar to those of the torsional angle FB compensating section 310, the torsional angular velocity calculating section 320, the velocity control section 330, the output limiting section 350 and the subtracting section 361, respectively.

In such a configuration, the operation example of the fourth embodiment will be described with reference to the flowchart of FIG. 25.

When the operation is started, the angle sensor 73 detects the turning angle θt and the angle sensor 74 detects the motor angle θm (Step S110). The turning angle θt is inputted into the turning angle control section 920 and the motor angle θm is inputted into the angular velocity calculating section 951.

The angular velocity calculating section 951 calculates the motor angular velocity ωm by differentiating the motor angle ωm and outputs the motor angular velocity ωm to the right-turning/left-turning judging section 300 (Step S120).

Then, the similar operations from the Step S10 to the Step S50 shown in FIG. 13 are performed, the reaction force motor 61 is driven, and the current control is performed (Steps S130 to S170).

In the turning angle control, the target turning angle generating section 910 inputs the steering angle θh and the steering angle θh is also inputted into the limiting section 931. The limiting section 931 limits the upper and lower limit values of the steering angle θh by using the preliminarily set upper and lower limit values (Step S180), and outputs the limited value as the steering angle θh1 to the rate limiting section 932. The rate limiting section 932 limits the change amount of the steering angle θh1 by using a preliminarily set limit value (Step S190), and outputs the limited value as the steering angle θh2 to the correcting section 933. The correcting section 933 corrects the steering angle θh2, obtains the target turning angle θtref (Step S200) and outputs the target turning angle θtref to the turning angle control section 920.

The turning angle control section 920 inputs the turning angle θt and the target turning angle θtref and calculates a deviation $\Delta\theta t_0$ by subtracting the turning angle θt from the target turning angle θtref at the subtracting section 927 (Step S210). The deviation $\Delta\theta t_0$ is inputted into the turning angle FB compensating section 921, and the turning angle FB compensating section 921 compensates the deviation $\Delta\theta t_0$ by multiplying the deviation $\Delta\theta t_0$ by the compensation value (Step S220) and outputs the target turning angular velocity ωtref to the velocity control section 923. The turning angular velocity calculating section 922 inputs the turning angle θt, calculates the turning angular velocity ωtt by differentiating the turning angle θt (Step S230) and outputs the turning angular velocity ωtt to the velocity control section 923. The velocity control section 923 calculates the motor current command value Imcta by using the I-P control as well as the operations of the velocity control section 330 (Step S240) and outputs the motor current command value Imcta to the output limiting section 926. The output limiting section 926 limits the upper and lower limit values of the motor current command value Imcta by using the preliminarily set upper and lower limit values (Step S250) and outputs the limited value as the motor current command value Imct (Step S260).

The motor current command value Imct is inputted into the current control section 930, and the current control section 930 drives the driving motor 71 based on the motor current command value Imct and the current value Imd of the driving motor 71 which is detected by the motor current detector 940, and performs the current control (Step S270).

Figure 25:
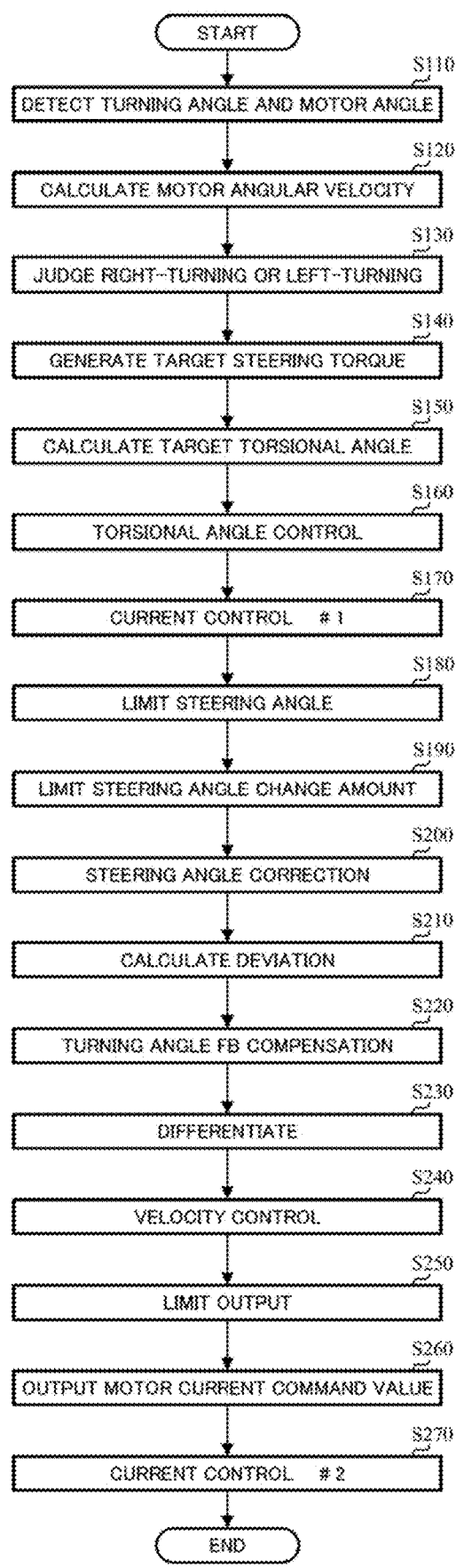
FIG. 25 is a flowchart showing an operation example of the present invention (the fourth embodiment).

The orders of inputting the data, the calculation and so on in FIG. 25 are appropriately changeable. As well as the velocity control section 330 in the torsional angle control section, the velocity control section 923 in the turning angle control section 920 may use not the I-P control but the realizable control including at least one of the P-control, the I-control and the D-control such as the PI-control, the P-control, the PID control or the PI-D control. Further, the following-up control in the turning angle control section 920 and the torsional angle control section 300 may be performed by the generally used control configuration. With respect to the turning angle control section 920, if the control configuration that the actual angle (the turning angle θt in this case) follows-up the target angle (the target turning angle θtref in this case) is employed, the control configuration is not limited to that of the apparatus for the vehicle. For example, the control configuration which is used in an industrial positioning apparatus, an industrial robot and so on may also be applied.

In the fourth embodiment, as shown in FIG. 21, one ECU 50 controls the reaction force unit 60 and the driving unit 70. The ECU for the reaction force unit 60 and the ECU for the driving unit 70 may independently be provided. In this case, respective ECUs transmit and receive the data by the communication. The SBW system shown in FIG. 21 does not have a mechanical connection between the reaction force unit 60 and the driving unit 70. The present invention is also applicable to the SBW system including the mechanical torque transmission mechanism in which the column shaft 2 mechanically connects to the turning mechanism via the clutch when the abnormality occurs in the system. In such an SBW system, when the system operates in a normal state, the clutch is off (disengaged) and the mechanical torque transmission is set to an open state. When the abnormality occurs in the system, the clutch is on (engaged) and the mechanical torque transmission is set to a usable state.

The torsional angle control section 300 in the first to the fourth embodiments and the assist control section 700 in the third embodiment directly calculate the motor current command value Imc and the assist current command value Iac. Alternatively, before calculating the motor current command value Imc and the assist current command value Iac, the expected motor torque (the target torque) is calculated and then the motor current command value and the assist current command value may be calculated. In this case, to obtain the motor current command value and the assist current command value, the generally used relationship between the motor current and the motor torque is utilized.

The drawings which are used in the explanation are a conceptual diagram for qualitatively explaining the present invention, but the present invention is not limited to the above drawings. While the above-described embodiments are examples of a preferable embodiment of the present invention, the present invention is not limited thereto and various modifications can be made without departing from the scope of the present invention. The mechanism which is disposed between the handle and the motor or between the handle and the reaction force motor and has any spring constant, may be used. The above mechanism may not be limited to the torsion bar.

The main object of the present invention is to achieve the unit to obtain the target steering torque for resolving the concern about the assist occurrence due to the offset value of the steering torque. The unit to follow-up the steering torque to the target steering torque may not be limited to the above-described unit including the converting section and the torsional angle control section.

EXPLANATION OF REFERENCE NUMERALS

1 handle
2 column shaft (steering shaft, handle shaft)
2A torsion bar
3 reduction mechanism
10 torque sensor
12 vehicle speed sensor
14 steering angle sensor
20 motor
30, 50 control unit (ECU)
31 current command value calculating section
33, 720 current limiting section
34 compensation signal generating section
38, 140, 940 motor current detector
60 reaction force unit
61 reaction force motor
70 driving unit
71 driving motor
72 gears
73, 74 angle sensor
100 EPS steering system/vehicle system 130, 930 current control section
200, 600 target steering torque generating section
210 basic map section
230 damper gain section
240 offset correcting section
241 offset correction calculating section
242 vehicle speed sensitive gain section
260 phase compensating section
300 torsional angle control section
310 torsional angle feed-back (FB) compensating section
320 torsional angular velocity calculating section
330, 923 velocity control section
340 stabilization compensating section
350, 926 output limiting section
400 converting section
500 right-turning/left-turning judging section
700 assist control section
910 target turning angle generating section
920 turning angle control section
921 turning angle feed-back (FB) compensating section
922 turning angular velocity calculating section
931 limiting section
932 rate limiting section
933 correcting section
951 angular velocity calculating section

The invention claimed is:

1. A vehicle steering apparatus that comprises, at least, a torsion bar having any spring constant and a sensor to detect a torsional angle of said torsion bar, and assist-controls a steering system by driving and controlling a motor, comprising:
a target steering torque generating section to generate a target steering torque;
a converting section to convert said target steering torque into a target torsional angle; and
a torsional angle control section to calculate a motor current command value so as to follow-up said torsional angle to said target torsional angle,
wherein said target steering torque generating section comprises an offset correcting section to obtain a first torque signal from a characteristic depending on a steering angle which is set based on an offset value of a steering torque and outputs said first torque signal as said target steering torque,
wherein said offset correcting section comprises an offset correction calculating section to calculate a basic torque signal depending on a steering state and said steering angle and outputs said basic torque signal which has a hysteresis characteristic whose absolute value is saturated to an absolute value of a hysteresis width which is larger than an absolute value of said offset value of said steering torque when said steering angle is within a predetermined angle range, as said first torque signal, and
wherein said vehicle steering apparatus drives and controls said motor based on said motor current command value.

2. The vehicle steering apparatus according to claim 1, wherein, in a case that said steering angle $\theta h$ varies from $-\theta h2$ to $+\theta h2$ in a right-turning steering and varies from $+\theta h2$ to $-\theta h2$ in a left-turning steering, said predetermined angle range of said steering angle is in a range from $-\theta h1$ to $+\theta h2$ ($\theta h2 > \theta h1 > 0$) in said right-turning steering and is in a range from $+\theta h1$ to $-\theta h2$ in said left-turning steering.

3. The vehicle steering apparatus according to claim 1,
wherein said offset correcting section further comprises a vehicle speed sensitive gain section to calculate said first torque signal by multiplying said basic torque signal by a vehicle speed sensitive gain.

4. The vehicle steering apparatus according to claim 3,
wherein said vehicle speed sensitive gain has a characteristic that a value of said vehicle speed sensitive gain becomes smaller when a vehicle speed is higher.

5. The vehicle steering apparatus according to claim 1,
wherein said target steering torque generating section further comprises:
a basic map section to obtain a second torque signal from said steering angle and said vehicle speed using a basic map; and
a damper calculating section to calculate a third torque signal based on an angular velocity information using a damper gain map which is sensitive to said vehicle speed, and
wherein said target steering torque generating section calculates said target steering torque from at least one of said second torque signal and said third torque signal and said first torque signal.

6. The vehicle steering apparatus according to claim 5,
wherein said basic map is sensitive to said vehicle speed and has a characteristic that said second torque signal is zero when said vehicle speed is zero.

7. The vehicle steering apparatus according to claim 5,
wherein said target steering torque generating section further comprises a phase compensating section which is disposed at a previous stage or a subsequent stage of said basic map section and performs a phase compensation, and obtains said second torque signal from said steering angle and said vehicle speed via said basic map section and said phase compensating section.

8. The vehicle steering apparatus according to claim 6,
wherein said target steering torque generating section further comprises a phase compensating section which is disposed at a previous stage or a subsequent stage of said basic map section and performs a phase compensation, and obtains said second torque signal from said steering angle and said vehicle speed via said basic map section and said phase compensating section.

* * * * *